United States Patent
Kikuchi

(10) Patent No.: US 8,023,573 B2
(45) Date of Patent: Sep. 20, 2011

(54) WIRELESS COMMUNICATION SYSTEM, WIRELESS COMMUNICATION DEVICE, AND VALID PATH DETECTION METHOD THEREFOR

(75) Inventor: Shingo Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 957 days.

(21) Appl. No.: 11/979,872

(22) Filed: Nov. 9, 2007

(65) Prior Publication Data

US 2008/0113636 A1     May 15, 2008

(30) Foreign Application Priority Data

Nov. 15, 2006 (JP) ................................ 2006-308524

(51) Int. Cl.
  *H04L 27/00* (2006.01)
(52) U.S. Cl. ....................................... 375/259; 375/349
(58) Field of Classification Search .................. 375/224, 375/227, 259, 260, 285, 349, 355
See application file for complete search history.

(56) References Cited

U.S. PATENT DOCUMENTS

| | | | | |
|---|---|---|---|---|
| 6,229,842 B1 * | 5/2001 | Schulist et al. | ............... | 375/148 |
| 6,510,143 B1 * | 1/2003 | Bejjani et al. | ................. | 370/320 |
| 7,050,484 B2 * | 5/2006 | Hirade | ........................... | 375/148 |
| 7,151,948 B2 * | 12/2006 | Ishii et al. | ...................... | 455/522 |
| 7,154,955 B2 * | 12/2006 | Suwa et al. | ..................... | 375/260 |
| 7,312,753 B2 * | 12/2007 | Inaba | ........................... | 342/465 |
| 7,313,171 B2 * | 12/2007 | Bilgic et al. | .................. | 375/148 |
| 2005/0078623 A1 * | 4/2005 | Hirade | .......................... | 370/320 |

FOREIGN PATENT DOCUMENTS

JP     2000-101549 A     4/2000

OTHER PUBLICATIONS

Teruo Kawamura, Hiroyuki Atarashi, and Mamoru Sawahashi, Wireless Laboratories, NTT DoCoMo, Inc., "Adaptive Transmission Timing Control Using Reservation Packet in Reverse Link for DS-CDMA Broadband Wireless Access", RCS2003-141, The Institute of Electronics, Information and Communication Engineers, Technical Reportof IEICE—(Oct. 2003).
"Physical Channels and Multiplexing in Evolved UTRA Uplink", 3GPP TSG RAN WG1 #42 on LTE R1-050850 (Original R1-050591), NTT DoCoMo, Fujitsu, NEC, SHARP—London, UK, Aug. 29-Sep. 2, 2005.
"W-CDMA Mobile Communication System, Chapter 2, Wireless Transmission System, 2-2, W-CDMA Basic Transmission Technology, c. High-Speed TPC based on the SIR Measurement" (edited by Keiji Tachikawa, published by Maruzen Publication, issued on Jun. 25, 2001, pp. 53-55).
Korean Office Action dated Nov. 27, 2008 with partial English-Language Translation of the Japanese-Language Translation.

* cited by examiner

*Primary Examiner* — Jean B Corrielus
(74) *Attorney, Agent, or Firm* — McGinn Intellectual Property Law Group, PLLC

(57) ABSTRACT

A wireless communication system according to an exemplary aspect of the present invention is a wireless communication system which performs wireless communications between a first wireless communication device and a second wireless communication device, wherein the first wireless communication device includes: a delay profile calculation unit for calculating a delay profile by calculating a correlation value for a received signal; a valid path detection unit for detecting a valid path using the delay profile and forcibly detecting a valid path when there is no path satisfying a condition of the valid path; and a forcible valid path notification unit for notifying that the valid path is forcibly detected.

25 Claims, 17 Drawing Sheets

WIRELESS COMMUNICATION SYSTEM, WIRELESS COMMUNICATION DEVICE, AND VALID PATH DETECTION METHOD THEREFOR

INCORPORATION BY REFERENCE

This application is based upon and claims the benefit of priority from Japanese patent application No. 2006-308524, filed on Nov. 15, 2006, the disclosure of which is incorporated herein in its entirety by reference.

BACKGROUND OF THE INVENTION

1. Field of the Invention

The present invention relates to a wireless communication system, a wireless communication device, and a valid path detection method used for the system, and more specifically to a wireless communication system including a valid path detecting function.

2. Description of the Related Art

In CDMA (code division multiple access) wireless communications, techniques of a path search, a RAKE combining, and an SIR (signal-to-interference power ratio) estimation are generally known.

In the CDMA wireless communications, a sequence (pilot signal) predetermined between a transmitter and a receiver is first inserted on the transmitter, and a convolution sum between a received signal and a pilot sequence is obtained on the receiver, thereby obtaining correlation power (delay profile) for a predetermined time period. FIG. 11 shows an example of the delay profile.

The path search technique is to detect a sample exceeding a predetermined path power level threshold from the delay profile. In FIG. 11, a path #1, a path #2, and a path #3 exceed the threshold, and a searcher detects the paths as path timing.

Then, based on the path timing detected by the searcher, the received signal is despread, the RAKE combining for the despread signal is performed, and demodulation, decode, CRC (cyclic redundancy check), etc. are performed. HARQ (hybrid automatic repeat request) is known as a technique of requesting retransmission of data to a transmitter when there is a CRC error.

FIG. 12 shows the operation of the HARQ at a receiver. In FIG. 12, the CRC issues permission after two retransmitting operations. In HARQ, since the likelihoods from demodulated signals can be added, a time diversity effect can be obtained.

That is, in FIG. 12, the processes are performed on new data in the HARQ operations of the receiver in the order of "path detection"→"despread"→"demodulation"→"calculation of likelihood #1"→"decode"→"error detection"→"issue of data retransmission instruction". On the first retransmitted data by the data retransmission instruction, the processes are performed in the order of "path detection"→"despread"→"demodulation"→"calculation of likelihood #2"→"combination of likelihood #1+likelihood #2"→"decode"→"error detection"→"issue of data retransmission instruction".

On the data in the second retransmission by the data retransmission instruction, the processes are performed in the order of "path detection"→"despread"→"demodulation"→"calculation of likelihood #3"→"combination of likelihood #1+likelihood #2+likelihood #3"→"decode"→"error detection"→"issue of new data transmission instruction".

Furthermore, to maintain the synchronization of reception timing between mobile terminals at a base station, there is an adaptive transmission timing control method (for example, refer to RCS2003-141, the Institute of Electronics, Information and Communication Engineers Technical Report). In the multiple access system by DS-CDMA (direct spread-CDMA), by securing the synchronization of reception timing between the terminals at the base station, the orthogonalization between reference paths can be secured between the terminals simultaneously accessing the base station, thereby improving the frequency use efficiency.

FIG. 13 shows a method of obtaining the delay profile of each of mobile terminals MS1 and MS1 at a base station. In the adaptive transmission timing control, based on the maximum propagation delay time (Tmax) of the incoming path at the base station, the propagation delay time (Tmax−T1) and (Tmax−T2) of the reference paths (valid path of highest power or leading valid path) T1 and T2 of the terminals MS1 and MS2 are calculated. The propagation delay time (Tmax−T1) is added to the control information for the terminal MS1, the propagation delay time (Tmax−T2) is added to the control information for the terminal MS2, and therefore each of the terminals MS1 and MS2 is notified of a transmission timing offset value.

Each of the terminals MS1 and MS2 demodulates the control information, adds the transmission timing offset value notified from the base station to a predetermined initial value, and offsets the transmission timing by the result to transmit data. Thus, the synchronization of the reference path timing between the terminals MS1 and MS2 is established at the Tmax position in the base station as shown in FIG. 14.

In the wireless communication system (for example, refer to "Physical Channels and Multiplexing in Evolved UTRA Uplink" (3GPP TSG RAN WG1 #42 on LTE R1-050850)) in the uplink proposed by the 3GPP LTE (3rd generation partnership project long term evolution), the cyclic prefix (CP) is inserted into a transmission signal, and the orthogonalization among users in the FDMA (frequency division multiple access) in the uplink is secured when the propagation delay difference between the reference paths of the users is equal to or less than the CP length.

In this system, there is a proposition of periodically transmitting a transmission timing measuring signal from a terminal to a base station using an uplink synchronization channel to realize the adaptive transmission timing control. In addition, in this system, there is indicated the possibility to replace the uplink synchronization channel with a pilot channel.

Furthermore, in estimating the signal-to-noise+interference power ratio, there is a method of estimating it from a channel estimation value or the like based on the path timing result (for example, refer to "W-CDMA Mobile Communication System, Chapter 2, Wireless Transmission System, 2-2, W-CDMA Basic Transmission Technology, c. High-Speed TPC based on the SIR Measurement" (edited by Keiji Tachikawa, published by Maruzen Publication, issued on Jun. 25, 2001, pp 53-55)). The chip noise power for use in a recently noted frequency domain equalizer is obtained by estimating signal power from a channel estimation value after obtaining the channel estimation value based on a path timing result, and subtracting the estimated signal power from the send/receive power. Since the dispersion of the noise power is large, a time average value is obtained using an oblivion coefficient.

The signal-to-noise+interference power ratio requires a high-accuracy estimation for use as a parameter of adaptive modulation/demodulation technology. If the chip noise power estimation accuracy is high, it is considered that the performance of a frequency domain equalizer is enhanced.

In the CDMA wireless communications, it is important to enhance the detection ratio and accuracy of the foremost path. Especially, in the path search, there can be the case where no path exceeding a path level threshold can be detected in a delay profile as shown in FIG. 15.

BRIEF SUMMARY OF THE INVENTION

An exemplary object of the present invention is to provide a wireless communication system, a wireless communication device, and a valid path detection method used for the system that do not collapse the adaptive transmission timing controlling operation even when no path exceeding a path level threshold is detected, perform radio resource control, and are capable of effectively using the radio resources.

Another exemplary object of the present invention is to provide a wireless communication system, a wireless communication device, and a valid path detection method for use with the system that are capable of improving the demodulation performance of a receiver, improving the estimation accuracy of chip noise power and the signal-to-noise+interference power ratio.

A wireless communication system according to a first exemplary aspect of the present invention is a wireless communication system which performs wireless communications between a first wireless communication device and a second wireless communication device, wherein the first wireless communication device includes: a delay profile calculation unit for calculating a delay profile by calculating a correlation value for a received signal; a valid path detection unit for detecting a valid path using the delay profile and forcibly detecting a valid path when there is no path satisfying a condition of the valid path; and a forcible valid path notification unit for notifying that the valid path is forcibly detected.

A wireless communication system according to a second exemplary aspect of the present invention is a wireless communication system, including:

a first wireless communication device including: a delay profile calculation unit for calculating a delay profile by calculating a correlation value for a received signal; a valid path detection unit for detecting a valid path using the delay profile; a transmission timing offset value calculation unit for calculating a transmission timing offset value from the valid path information; and a transmission timing measuring signal control information generation unit for generating information for control of transmission of a transmission timing measuring signal; and a second wireless communication device including: a transmission timing control unit for controlling the transmission timing offset value; and a transmission timing measuring signal control unit for controlling transmission of the transmission timing measuring signal, wherein the transmission timing offset control in the transmission timing control unit and the transmission timing measuring signal transmission control in the transmission timing measuring signal control unit are performed based on the transmission timing offset value and the control information generated by the transmission timing measuring signal control information generation unit.

A wireless communication device according to a third exemplary aspect of the present invention is a wireless communication device which performs wireless communications with other wireless communication device, including: a delay profile calculation unit for calculating a delay profile by calculating a correlation value for a received signal; a valid path detection unit for detecting a valid path using the delay profile and forcibly detecting a valid path when there is no path satisfying a condition of the valid path; and a forcible valid path notification unit for notifying that the valid path is forcibly detected.

A wireless communication device according to a fourth exemplary aspect of the present invention is a wireless communication device which performs wireless communications with the other wireless communication device, including: a delay profile calculation unit for calculating a delay profile by calculating a correlation value for a received signal; a valid path detection unit for detecting a valid path using the delay profile; a transmission timing offset value calculation unit for calculating a transmission timing offset value from the valid path information; and a transmission timing measuring signal control information generation unit for generating information for control of transmission of a transmission timing measuring signal, wherein the other wireless communication device performs transmission timing offset control and transmission timing measuring signal transmission control based on the transmission timing offset value and the control information generated by the transmission timing measuring signal control information generation unit.

A valid path detection method according to a fifth exemplary aspect of the present invention is a valid path detection method for use with a wireless communication system which performs wireless communications between a first wireless communication device and a second wireless communication device, including:

calculating, at the first wireless communication device, a delay profile by calculating a correlation value for a received signal; and detecting, at the first wireless communication device, a valid path using the delay profile, wherein the valid path is forcibly detected when there is no path satisfying a condition of the valid path.

DETAILED DESCRIPTION OF EXEMPLARY EMBODIMENTS

Exemplary embodiments of the present invention are described below with reference to the attached drawings.

Figure 1:
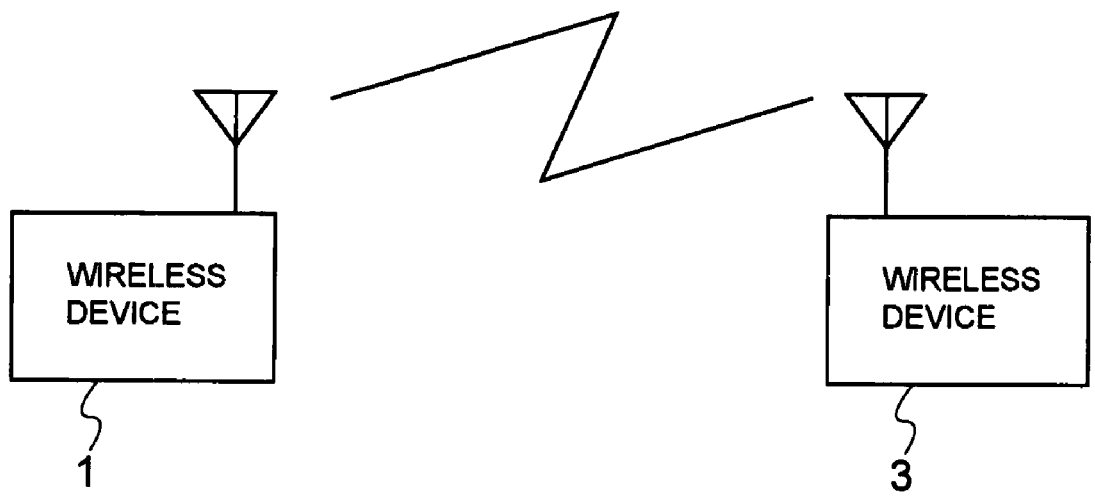
FIG. 1 is a block diagram showing the configuration of a wireless communication system according to a first exemplary embodiment of the present invention.
Figure 2:
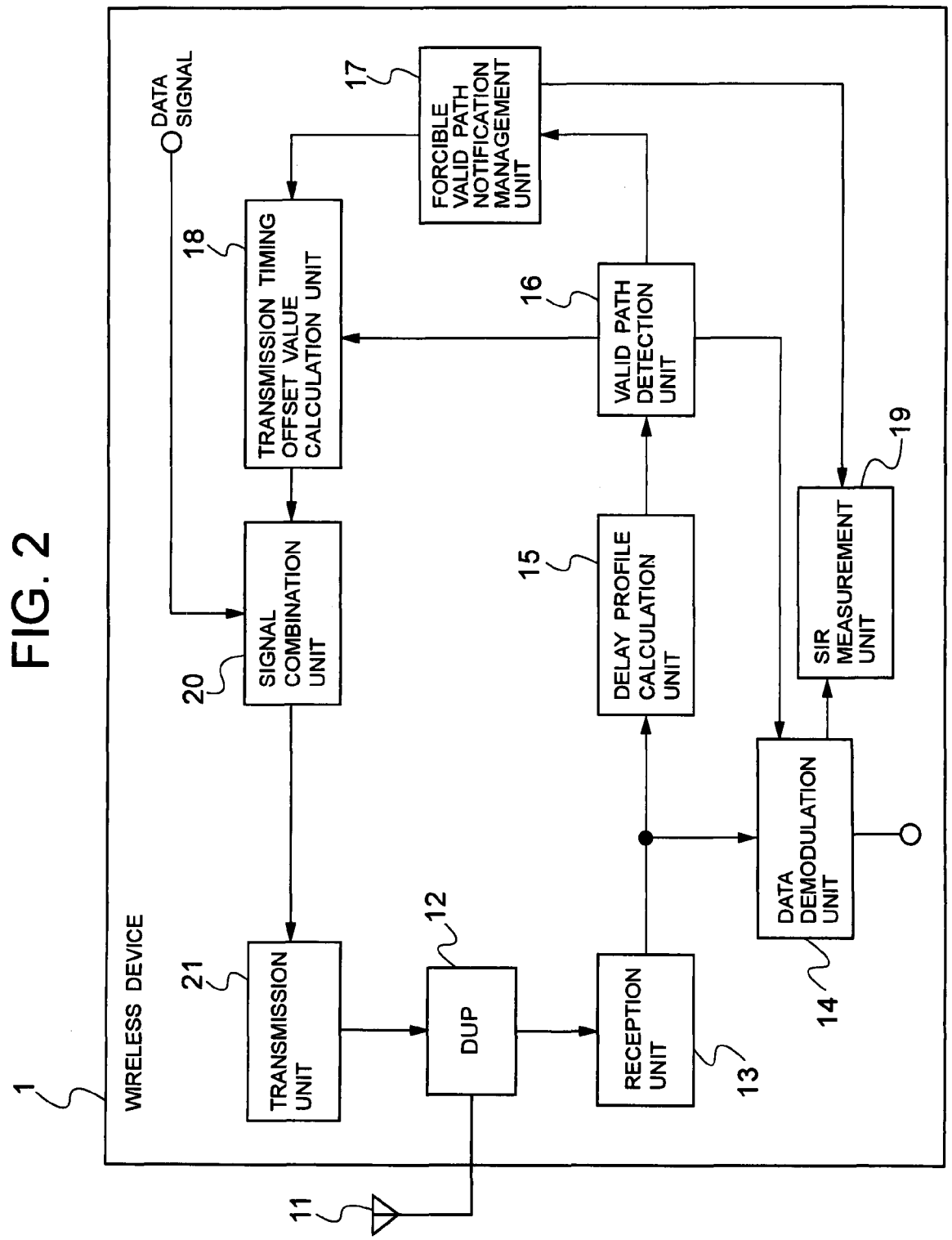
FIG. 2 is a block diagram showing the configuration of a wireless device in the wireless communication system according to the first exemplary embodiment of the present invention.
Figure 3:
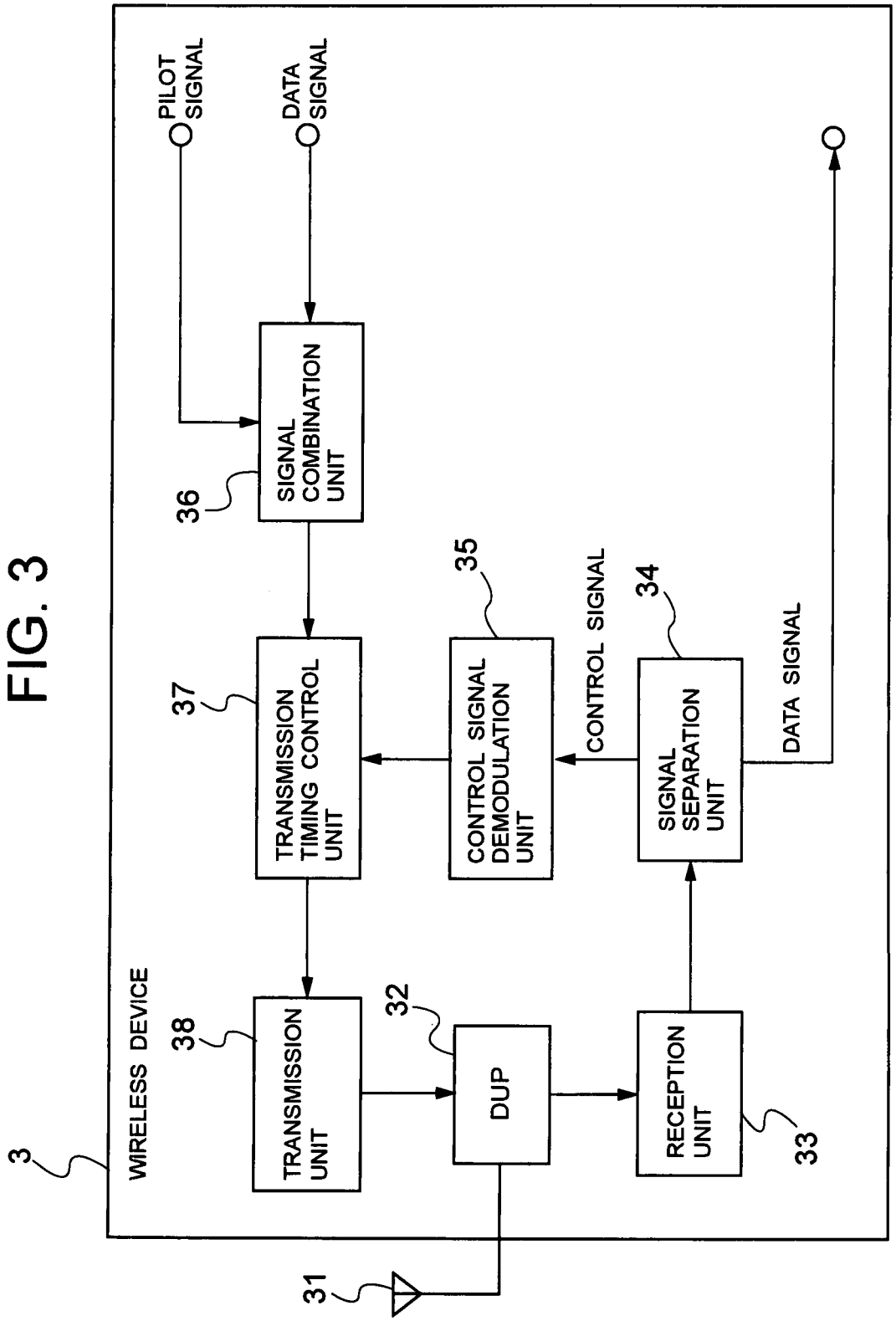
FIG. 3 is a block diagram showing the configuration of a wireless device in the wireless communication system according to the first exemplary embodiment of the present invention.

FIG. 1 is a block diagram showing the configuration of a wireless communication system according to a first exemplary embodiment of the present invention. FIGS. 2 and 3 are block diagrams showing the configuration of a wireless device in the wireless communication system according to the first exemplary embodiment of the present invention. In FIG. 1, a wireless device 1 and a wireless device 3 perform wireless communication with each other.

In FIG. 2, the wireless device 1 includes an antenna 11, a duplexer (DUP) 12, a reception unit 13, a data demodulation unit 14, a delay profile calculation unit 15, a valid path detection unit 16, a forcible valid path notification management unit 17, a transmission timing offset value calculation unit 18, an SIR (signal-to-interference power ratio) measurement unit 19, a signal combination unit 20, and a transmission unit 21.

The reception unit 13 transmits a signal from the wireless device 3 received through the antenna 11 and the duplexer 12 to the data demodulation unit 14 and the delay profile calculation unit 15. The delay profile calculation unit 15 despreads the received pilot signal, performs a correlation calculation, and calculates a delay profile.

The valid path detection unit 16 detects an incoming path exceeding a path level threshold from the delay profile, defines the path as a valid path, and notifies the data demodulation unit 14 and the transmission timing offset value calculation unit 18 of the timing of the valid path. The forcible valid path notification management unit 17 is informed of the detection of a path when there is a path exceeding the threshold, and of the no path detection information when there is no path exceeding the threshold.

The data demodulation unit 14 performs a despread, a channel estimation, a RAKE combining and a data demodulation using the valid path timing. The forcible valid path notification management unit 17 notifies the transmission timing offset value calculation unit 18 and the SIR measurement unit 19 of the path detection information. The transmission timing offset value calculation unit 18 calculates a transmission timing offset value to be added when data is transmitted next time to the wireless device 3 such that the path of the highest power in the valid paths can be located at a target path reception position Tmax.

The SIR measurement unit 19 calculates an S and an I, and then calculates the SIR. The signal combination unit 20 combines a transmission data signal with the transmission timing offset value (control information), and transmits the result to the wireless device 3 through the transmission unit 21, the duplexer 12 and the antenna 11.

In FIG. 3, the wireless device 3 includes an antenna 31, a duplexer 32, a reception unit 33, a signal separation unit 34, a control signal demodulation unit 35, a signal combination unit 36, a transmission timing control unit 37, and a transmission unit 38.

The reception unit 33 transmits the signal from the wireless device 1 received through the antenna 31 and the duplexer 32 to the signal separation unit 34. The signal separation unit 34 separates the received signal into the data signal and the control signal, and transmits the control signal to the control signal demodulation unit 35. The control signal demodulation unit 35 demodulates the control signal, and transmits the transmission timing offset value in the demodulated control information to the transmission timing control unit 37.

The signal combination unit 36 combines a transmission data signal and a pilot signal, and transmits the combined signal to the transmission timing control unit 37. The transmission timing control unit 37 delays the signal from the signal combination unit 36 by the transmission timing offset value, and then transmits the signal to the wireless device 1 through the transmission unit 38, the duplexer 32 and the antenna 31.

Figure 4:
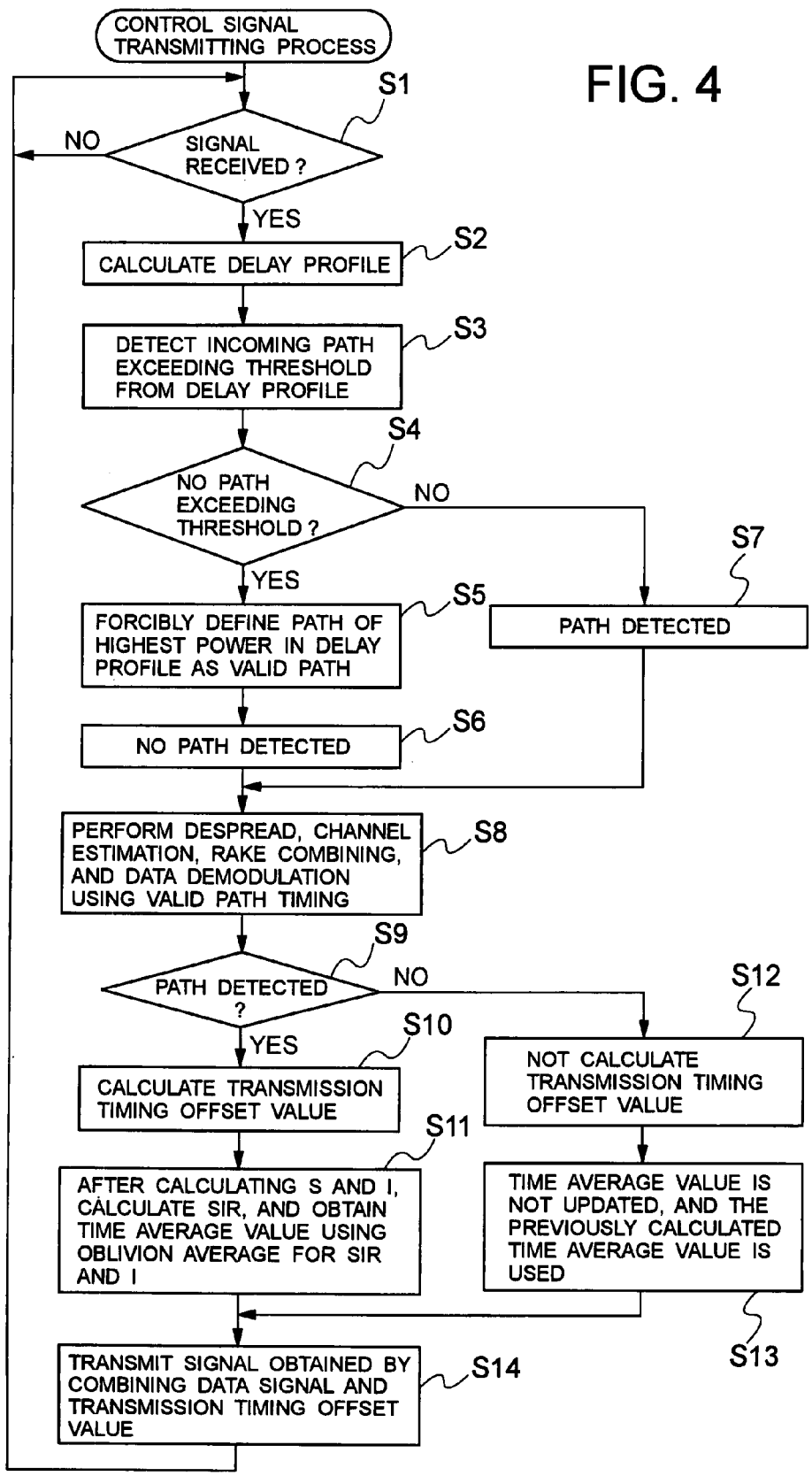
FIG. 4 is a flowchart showing the operation of the wireless device 1 shown in FIG. 2.
Figure 5:
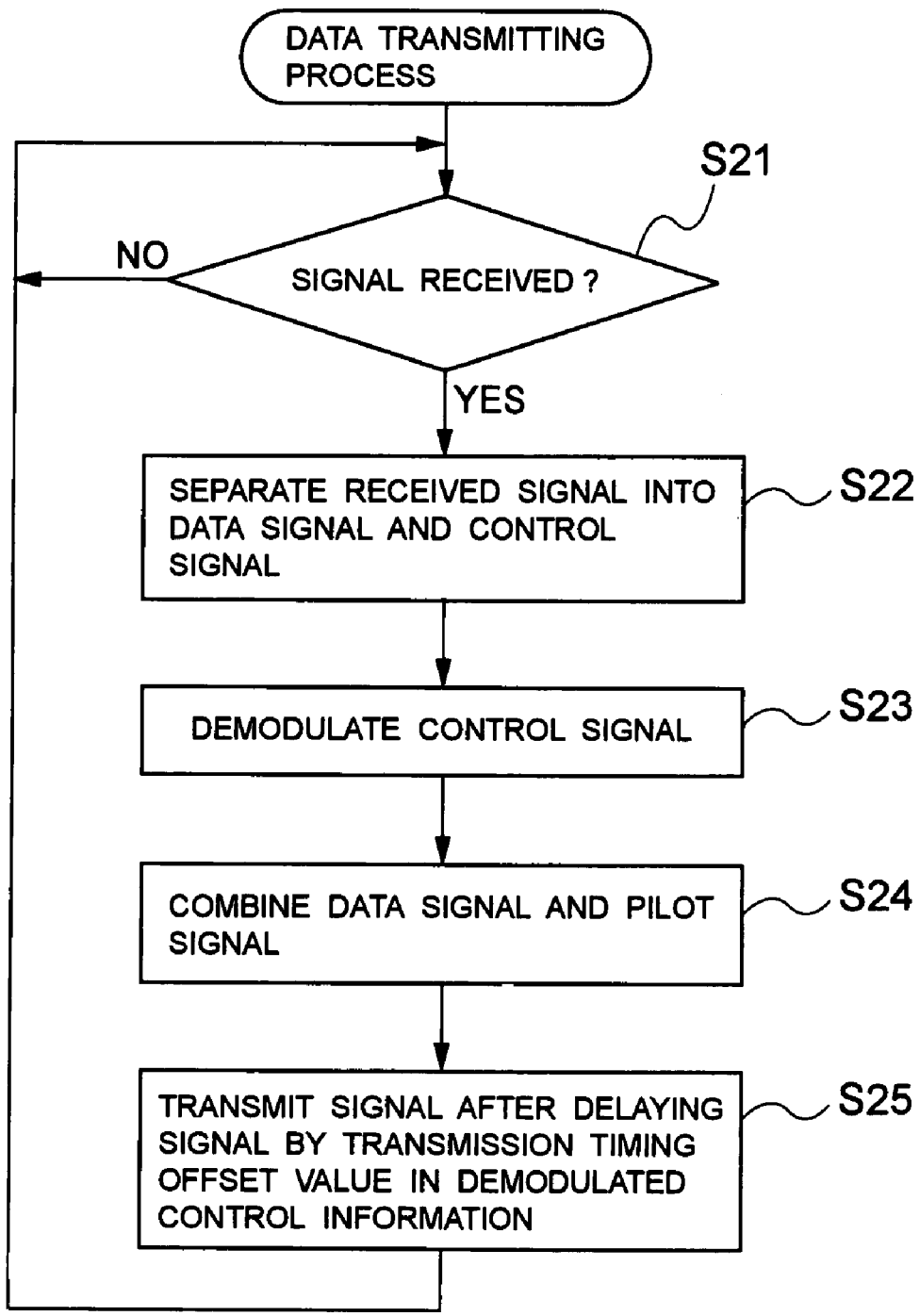
FIG. 5 is a flowchart showing the operation of the wireless device 3 shown in FIG. 3.

FIG. 4 is a flowchart showing the operation of the wireless device 1 shown in FIG. 2. FIG. 5 is a flowchart showing the operation of the wireless device 3 shown in FIG. 3. With reference to FIGS. 1 to 5, the operations of the wireless communication system according to the first exemplary embodiment of the present invention are described below. The processes shown in FIG. 4 can also be realized by the CPU (central processing unit), of the wireless device 1 but not shown in the attached drawings, executing a program. The processes shown in FIG. 5 can also be realized by the CPU, of the wireless device 3 but not shown in the attached drawings, executing a program.

The reception unit 13 of the wireless device 1 transmits the signal from the wireless device 3 received through the antenna 11 and the duplexer 12 to the data demodulation unit 14 and the delay profile calculation unit 15 (step S1 shown in FIG. 4). The delay profile calculation unit 15 despreads the received pilot signal from the wireless device 3 and then performs correlation calculation, and calculates a delay profile (step S2 shown in FIG. 4)

The valid path detection unit 16 detects an incoming path exceeding the path level threshold from the delay profile calculated by the delay profile calculation unit 15 (step S3 shown in FIG. 4), and defines the detected path as a valid path. On the other hand, when there is no path exceeding the threshold (step S4 shown in FIG. 4), the valid path detection unit 16 defines a path of the highest power in the delay profile forcibly as a valid path (step S5 shown in FIG. 4). The valid path detection unit 16 notifies the data demodulation unit 14 and the transmission timing offset value calculation unit 18 of the timing of the valid path.

The forcible valid path notification management unit 17 is notified of the "detection of a path" when there is a path exceeding the threshold (S7 shown in FIG. 4). When there is no path exceeding the threshold, and a valid path is forcibly determined, the forcible valid path notification management unit 17 is notified of the "no path detection" (step S6 shown in FIG. 4).

The data demodulation unit 14 performs a despread, a channel estimation, a RAKE combining and a data demodulation using the valid path timing from the valid path detection unit 16 (step S8 shown in FIG. 4). The forcible valid path notification management unit 17 notifies the transmission timing offset value calculation unit 18 and the SIR measurement unit 19 of the path detection information.

The transmission timing offset value calculation unit 18 calculates the transmission timing offset value to be added when data is transmitted next time to the wireless device 3 such that the path of the highest power in the valid paths can be located at the target path reception position Tmax (step S10 shown in FIG. 4). When the path detection information from the forcible valid path notification management unit 17 is "no path detection", the transmission timing offset value calculation unit 18 is not operated (steps S9 and S12 shown in FIG. 4).

After the SIR measurement unit 19 calculates the S and I, it calculates the SIR, and obtains a time average value using an oblivion coefficient on the SIR and I (step S11 shown in FIG. 4). When the path detection information notified from the forcible valid path notification management unit 17 is "no path detection", the SIR measurement unit 19 does not update the time average. That is, the time average value at last time is used (step S13 shown in FIG. 4).

The signal combination unit 20 combines the transmission data signal and the transmission timing offset value (control information), and transmits the result to the wireless device 3 through the transmission unit 21, the duplexer 12 and the antenna 11 (step S14 shown in FIG. 4).

The reception unit 33 of the wireless device 3 transmits to the signal separation unit 34 the signal received from the wireless device 1 through the antenna 31 and the duplexer 32 (step S21 shown in FIG. 5). The signal separation unit 34 separates the received signal into the data signal and the control signal (step S22 shown in FIG. 5), and transmits the control signal to the control signal demodulation unit 35.

The control signal demodulation unit 35 demodulates the control signal (step S23 shown in FIG. 5), and transmits the transmission timing offset value in the demodulated control information to the transmission timing control unit 37. The signal combination unit 36 combines the transmission data signal and the pilot signal (step S24 shown in FIG. 5), and transmits the result to the transmission timing control unit 37. The transmission timing control unit 37 delays the signal from the signal combination unit 36 by the transmission timing offset value, and then transmits the signal to the wireless device 1 through the transmission unit 38, the duplexer 32 and the antenna 31 (step S25 shown in FIG. 5).

Thus, according to the first exemplary embodiment, when a searcher can detect no sample exceeding the path level threshold in the delay profile, a one valid path is forcibly defined, thereby improving the demodulation performance of a receiver.

At this time, according to the first exemplary embodiment, the transmission timing offset value calculation unit 18 is notified that a valid path is forcibly determined, and the calculation of the transmission timing offset value is stopped, thereby preventing the collapse of the adaptive transmission timing controlling operation. Furthermore, according to the first exemplary embodiment, the results of the estimation of chip noise power and signal-to-noise+interference power ratio are not updated, thereby improving the estimation accuracy.

In the first exemplary embodiment, the valid path detection unit 16 may forcibly assign a path of the highest power in the paths detected last time as a valid path. In the despread and demodulation processes of the data demodulation unit 14, although the power of a path is as low as the level not exceeding the threshold, it is better to provide this path timing as a component of time diversity by the HARQ (hybrid automatic repeat request) and reception antenna diversity so far as the path timing is correct, thereby improving the S/N (signal/noise) by the MRC (maximal ratio combining) and RAKE combining, and improving the characteristic. Furthermore, although wrong path timing is provided, no critical result occurs in operations.

On the other hand, in the first exemplary embodiment, the transmission timing offset value calculation unit 18 suppresses an issue of a request to change the transmission timing when a notification that a path is forcibly defined as a valid path is received. If the path timing is correct, the convergence time to the target position is shortened in the adaptive transmission timing control. However, if wrong path timing is attempted to be moved to a correct position, then the true path timing position is largely deviated from a range where a search can be performed, and user path timing is completely lost.

The above-mentioned state will be described using FIGS. 16 and 17. The transmission timing is delayed such that the path of the highest power can be located at the position of the maximum propagation delay time Tmax of an incoming path shown in FIG. 16. Since the maximum propagation delay time Tmax of an incoming path is the maximum propagation delay time in the possible signal delay time, it is considered that a further delayed position is designed as a range not to be searched.

Figure 16:
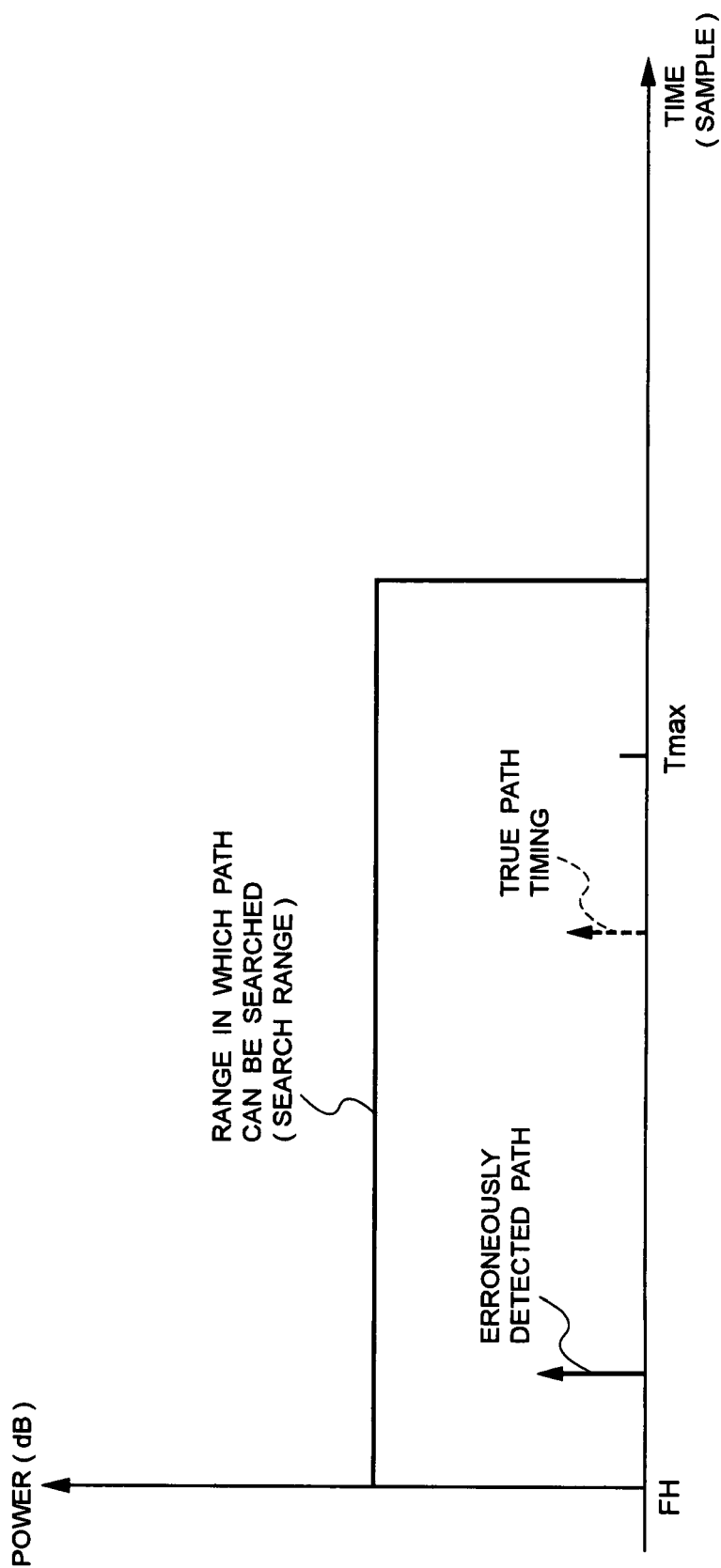
FIG. 16 is an explanatory view of an operation of adaptive transmission timing control in the case where a path is erroneously detected.
Figure 17:
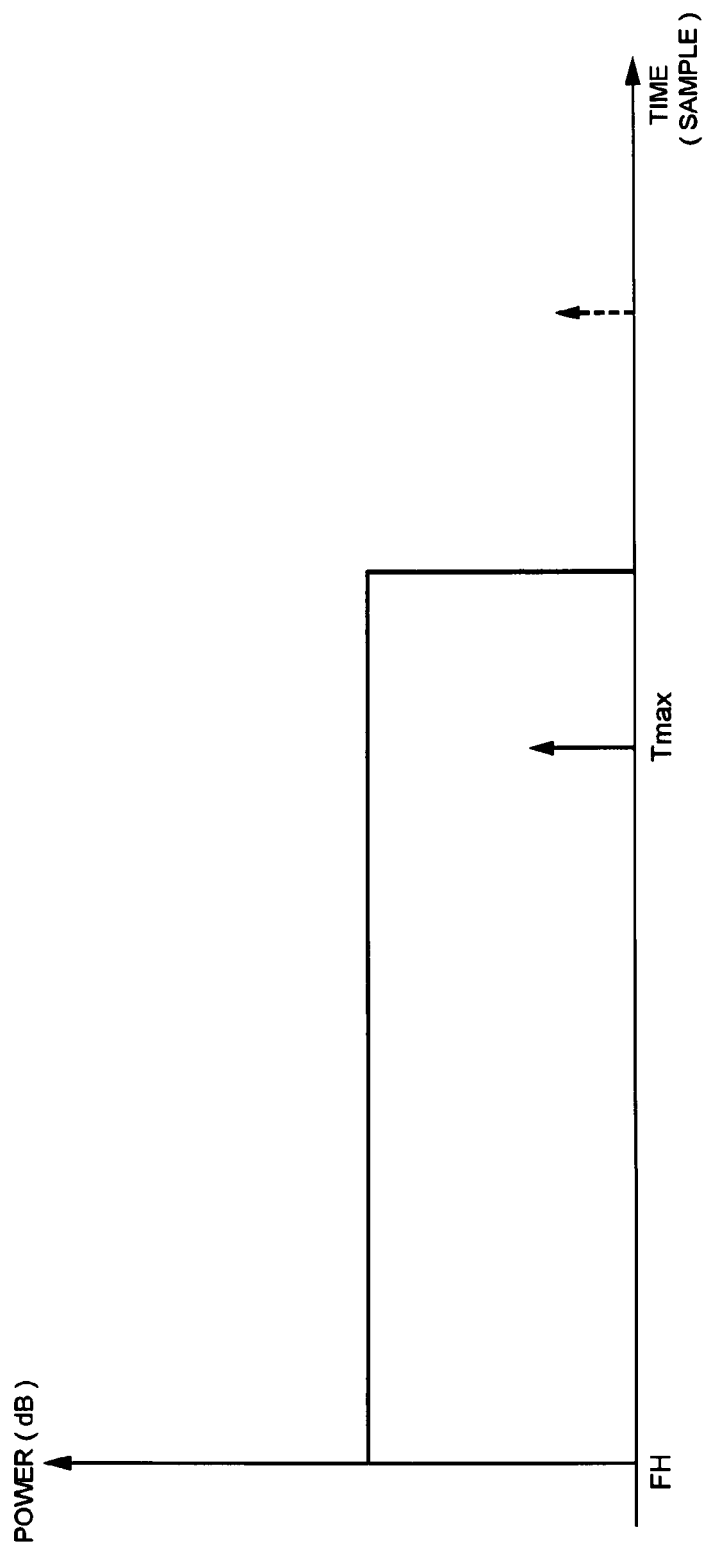
FIG. 17 is an explanatory view of an operation of adaptive transmission timing control in the case where a path is erroneously detected.

In FIG. 16, a true path timing position is depressed, and a wrong path is selected as a path of the highest power. As shown in FIG. 17, if this path is moved to the position of the maximum propagation delay time Tmax of an incoming path, the true path timing is deviated from the search range, and the path is lost. When a request to change the transmission timing is issued, it is necessary to have selected a high reliability path as a path of the highest power.

When high accuracy is required as estimation accuracy of chip noise power for use in a CDMA (code division multiple access) frequency domain equalizer, or as the estimation accuracy of the signal-to-noise+interference power ratio, it is considered that the estimation accuracy is degraded if the chip noise power and the signal-to-noise+interference power ratio are obtained by performing a channel estimation based on a low reliable path. Therefore, when a valid path is forcibly defined, the SIR measurement unit 19 does not update a time-averaged estimated value.

Figure 6:
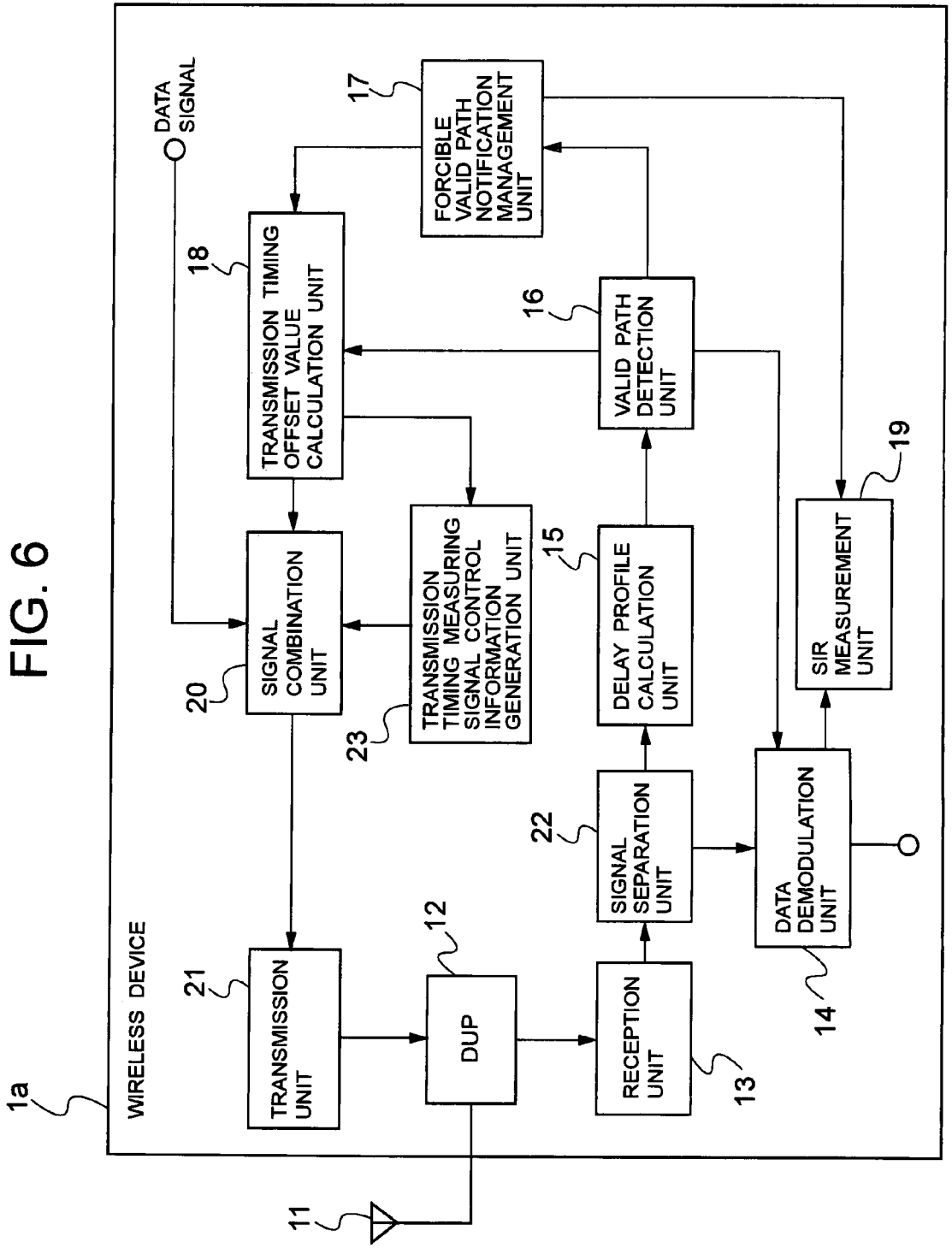
FIG. 6 is a block diagram showing the configuration of a wireless device in a wireless communication system according to a second exemplary embodiment of the present invention.
Figure 7:
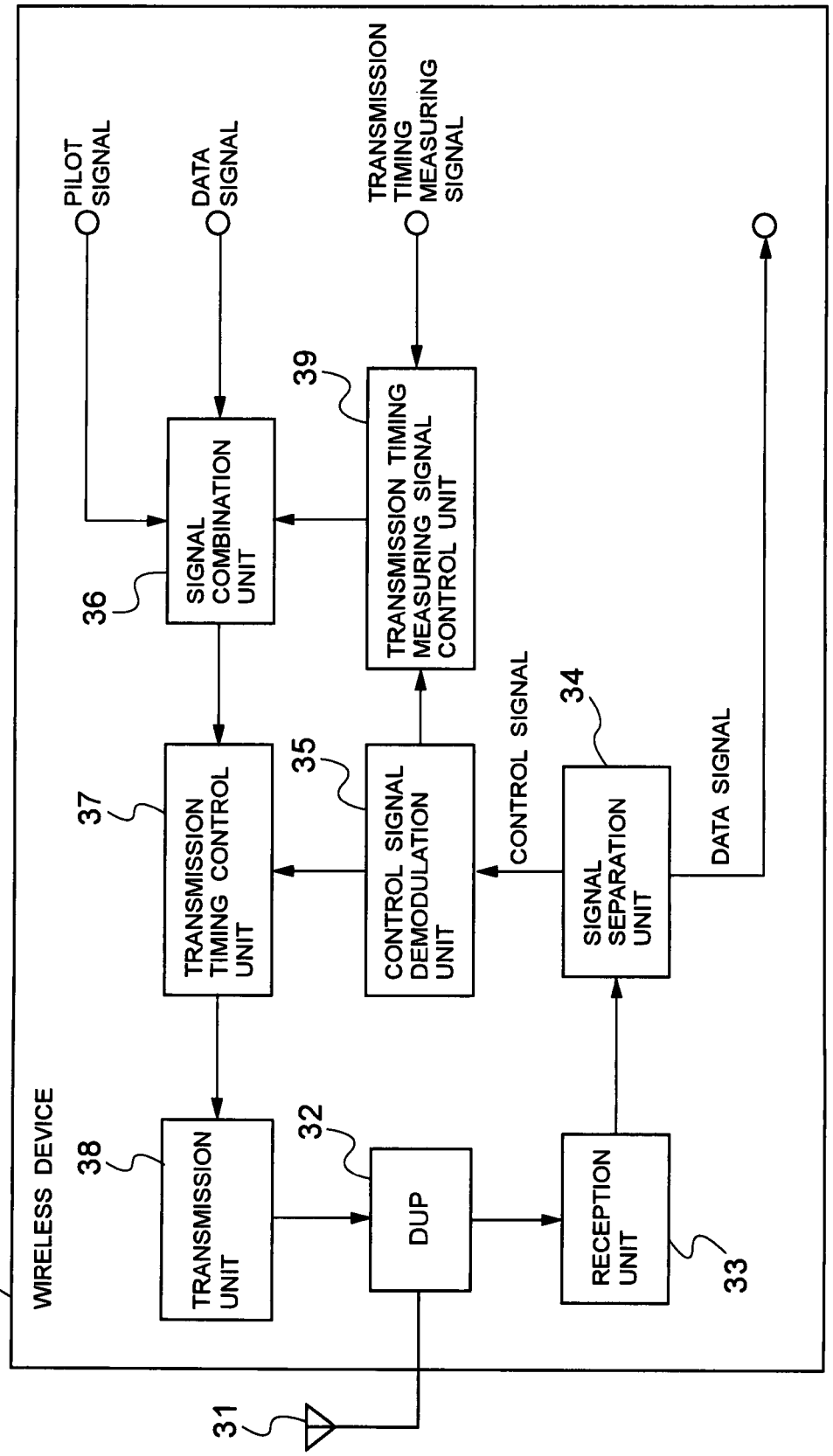
FIG. 7 is a block diagram showing the configuration of a wireless device in the wireless communication system according to the second exemplary embodiment of the present invention.
Figure 8:
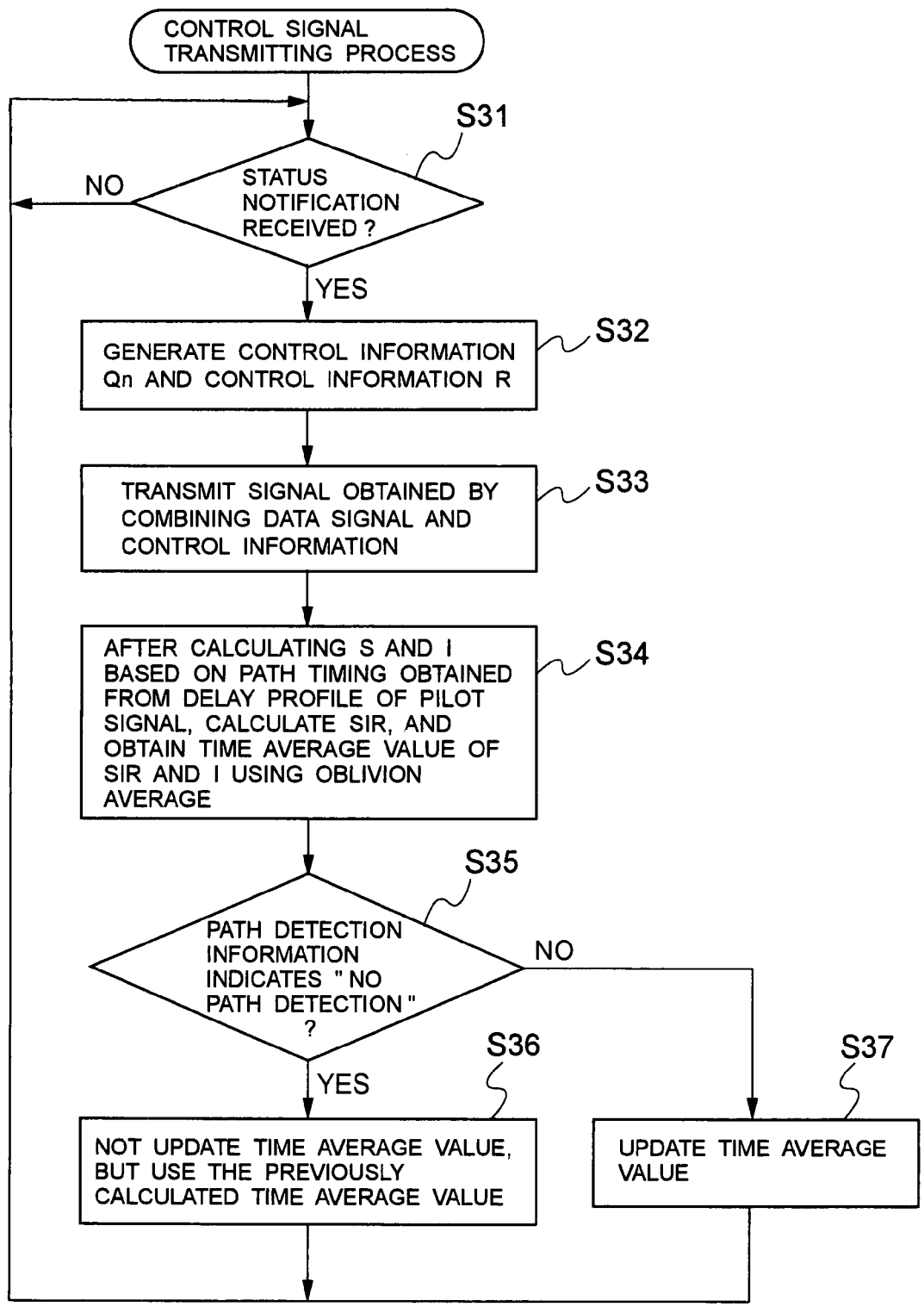
FIG. 8 is a flowchart showing the operation of the wireless device 1*a* shown in FIG. 6.
Figure 9:
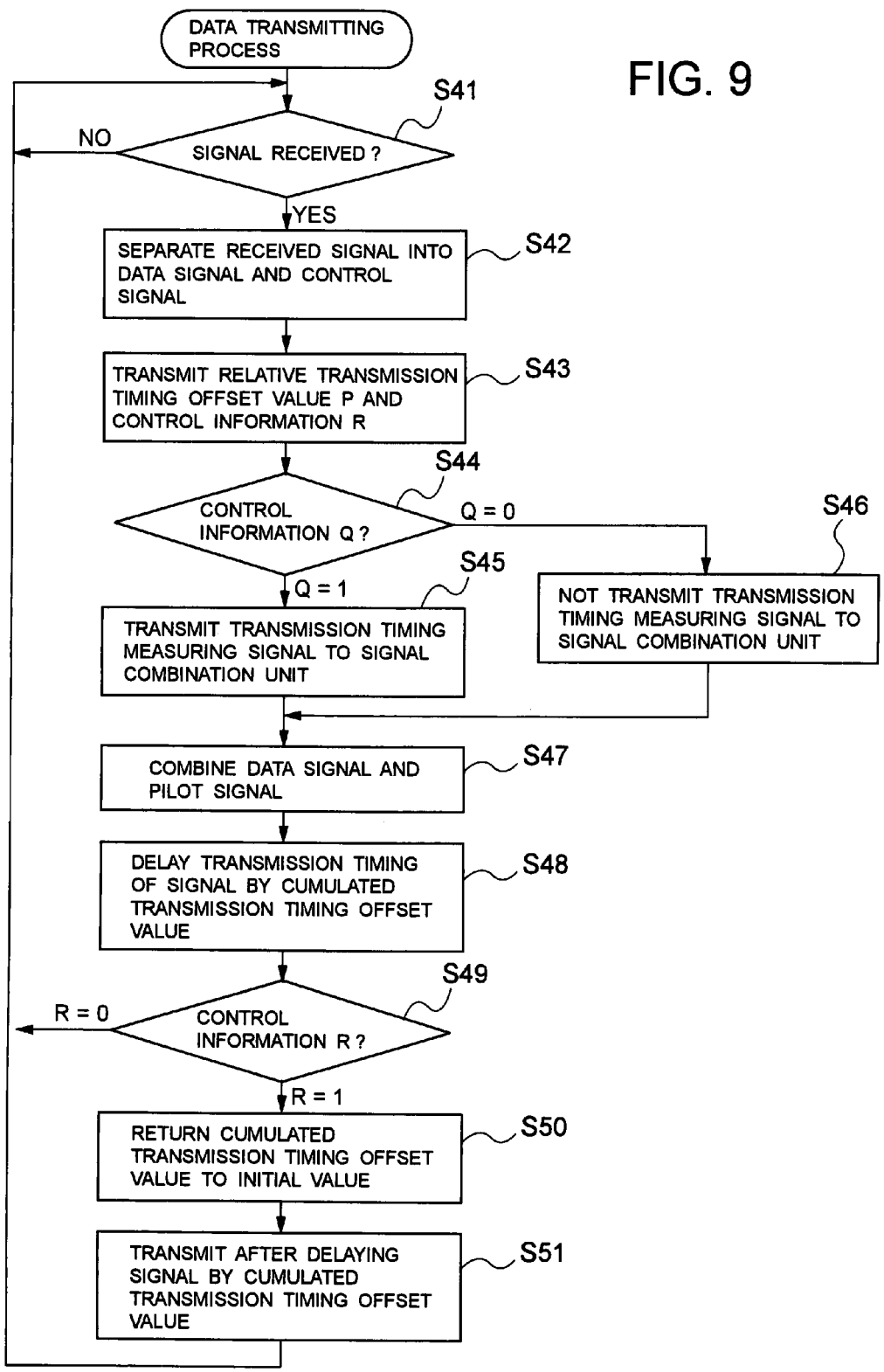
FIG. 9 is a flowchart showing the operation of the wireless device 3*a* shown in FIG. 7.
Figure 10:
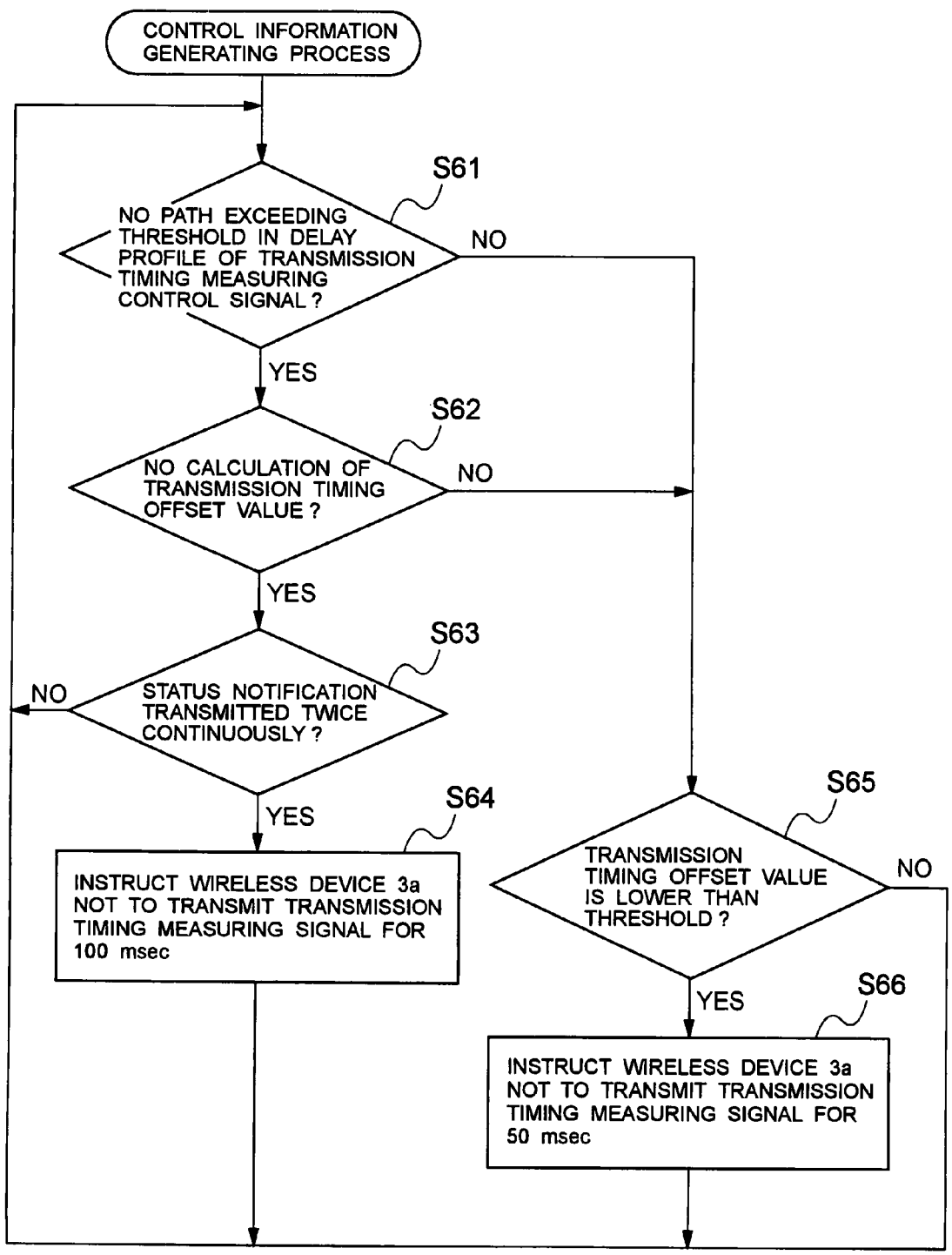
FIG. 10 is a flowchart showing the operation of a transmission timing measuring signal transmission control information generation unit shown in FIG. 6.
Figure 11:
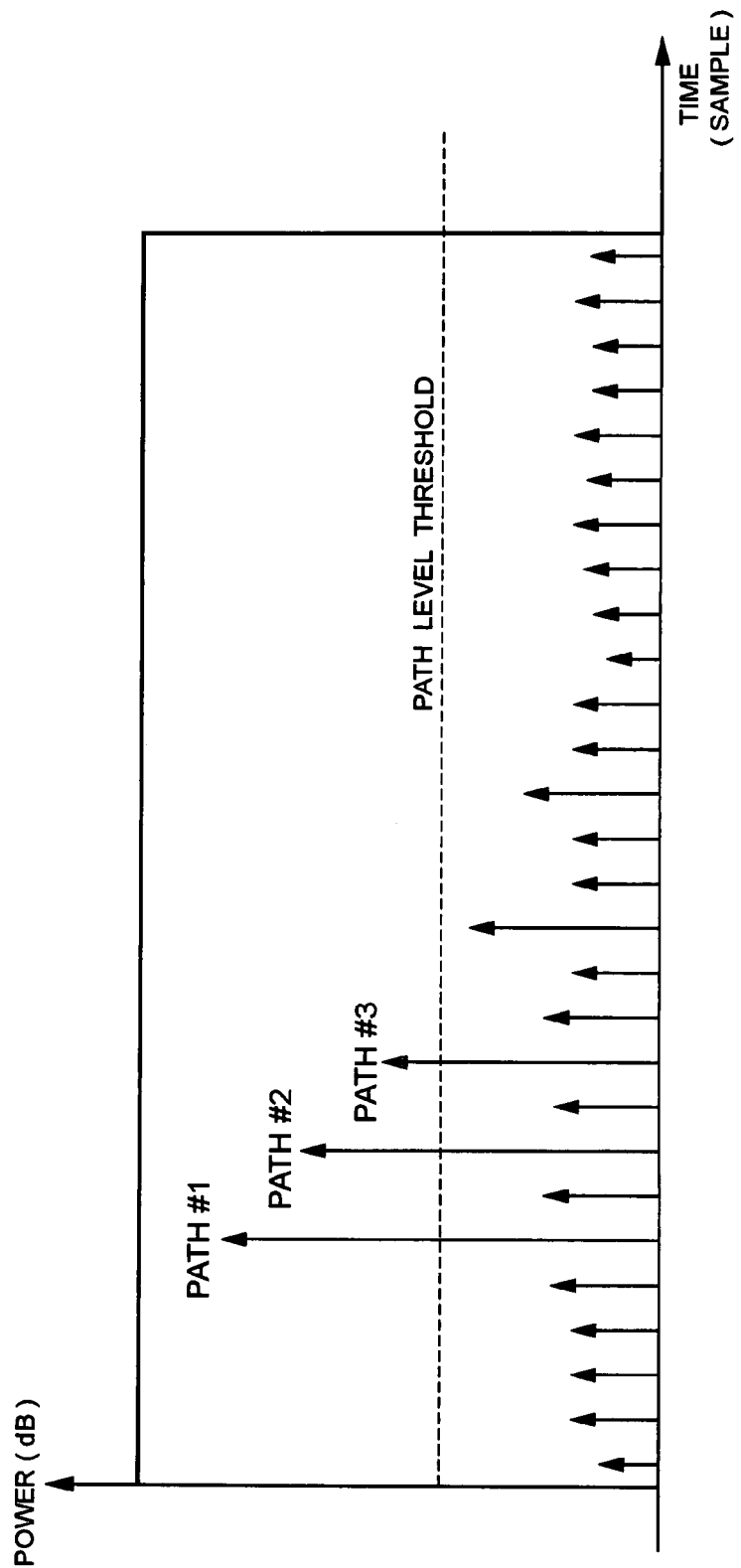
FIG. 11 is an explanatory view of a path search.
Figure 12:
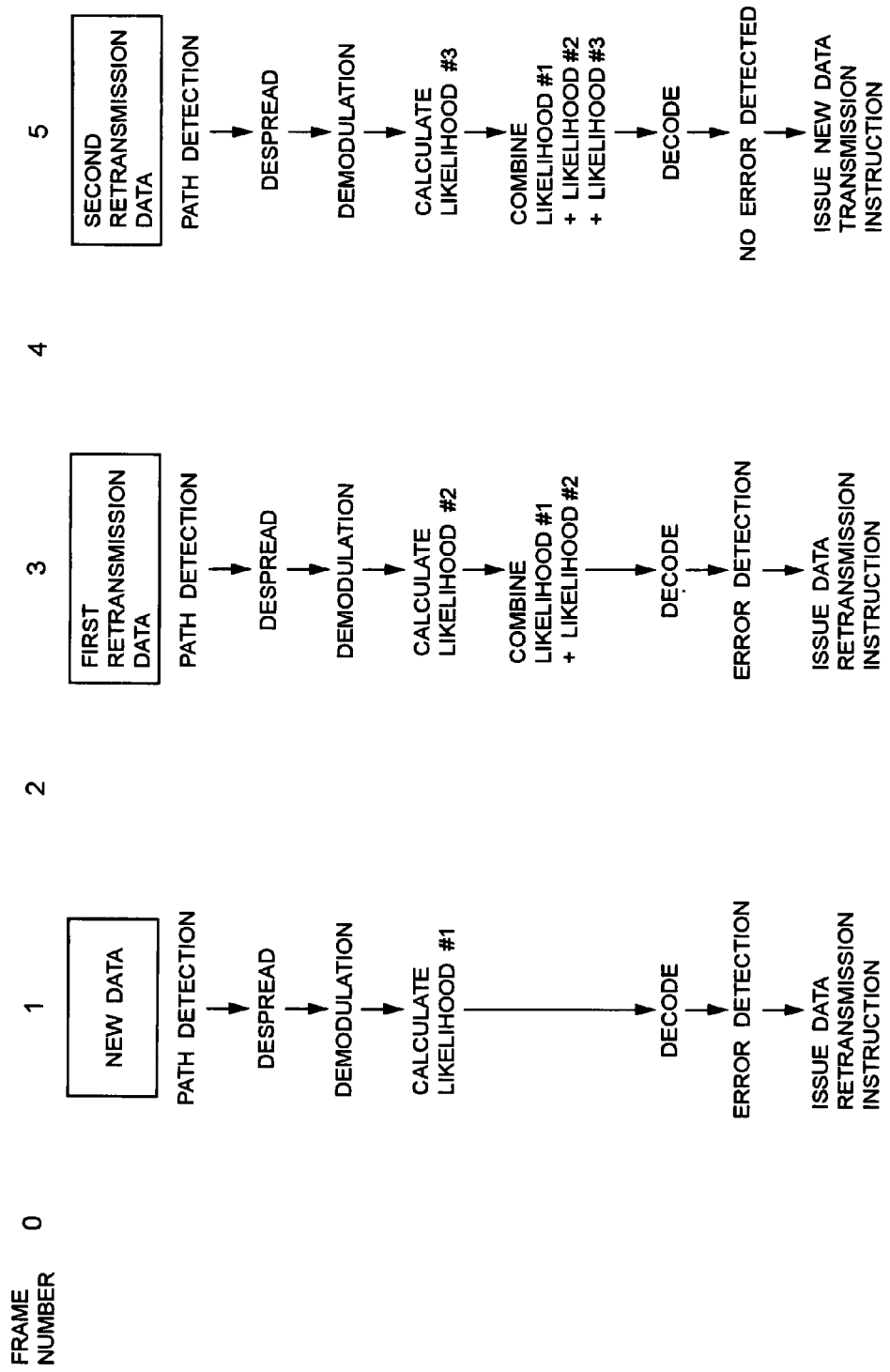
FIG. 12 is an explanatory view of a HARQ.
Figure 13:
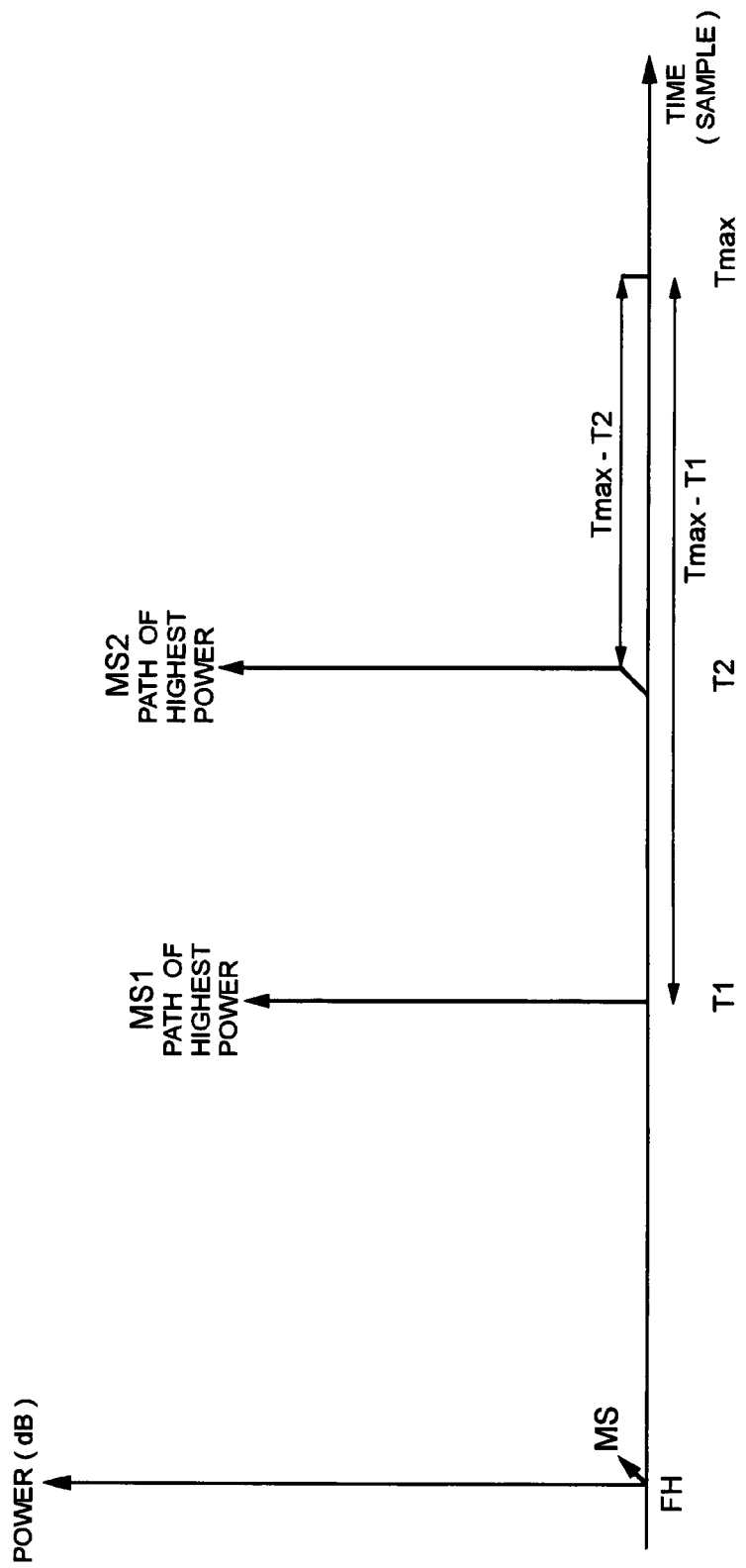
FIG. 13 is an explanatory view of the status before an adaptive transmission timing operation.
Figure 14:
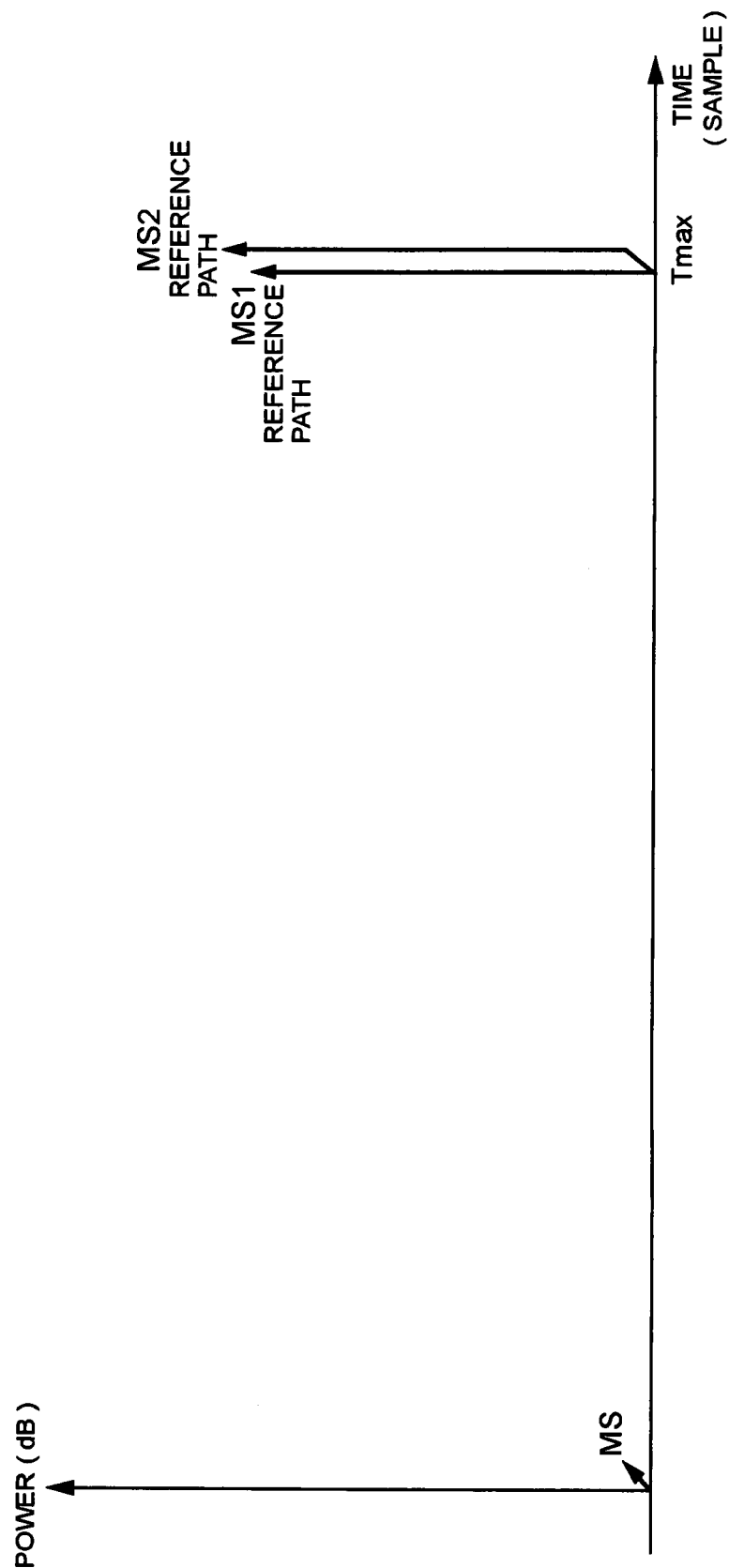
FIG. 14 is an explanatory view of the convergence status after the adaptive transmission timing operation.

FIGS. 6 and 7 are block diagrams showing the configuration of a wireless device in a wireless communication system according to a second exemplary embodiment of the present invention. FIG. 8 is a flowchart showing the operation of the wireless device 1a shown in FIG. 6. FIG. 9 is a flowchart showing the operation of the wireless device 3a shown in FIG. 7. FIG. 10 is a flowchart showing the operation of a transmission timing measuring signal transmission control information generation unit 23 shown in FIG. 6. In FIG. 6, the wireless device 1a according to the second exemplary embodiment of the present invention has the same configuration as the wireless device 1 according to the first exemplary embodiment of the present invention shown in FIG. 2 except a signal separation unit 22 and the transmission timing measuring signal transmission control information generation unit 23 are provided, and the same component is assigned the same reference numeral. In FIG. 7, the wireless device 3a according to the second exemplary embodiment of the present invention has the same configuration as the wireless device 3 according to the first exemplary embodiment of the present invention shown in FIG. 3 except a transmission timing measuring signal control unit 39 is provided, and the same component is assigned the same reference numeral.

In FIG. 6, the wireless device 1a includes an antenna 11, a duplexer (DUP) 12, a reception unit 13, a data demodulation unit 14, a delay profile calculation unit 15, a valid path detection unit 16, a forcible valid path notification management unit 17, a transmission timing offset value calculation unit 18, an SIR (signal-to-interference power ratio) measurement unit 19, a signal combination unit 20, a transmission unit 21, a signal separation unit 22, and a transmission timing measuring signal control information generation unit 23.

The reception unit 13 transmits to the signal separation unit 22 a signal received from the wireless device 3a through the antenna 11 and the duplexer 12. The signal separation unit 22 separates the received signal into a data signal, a pilot signal, and a transmission timing measuring control signal, and transmits the data signal to the data demodulation unit 14, and the pilot signal and the transmission timing measuring control signal to the delay profile calculation unit 15. The delay profile calculation unit 15 performs a correlation calculation on the pilot signal and the transmission timing measuring control signal, and calculates a delay profile for each signal.

The valid path detection unit 16 detects an incoming path exceeding a path level threshold from the delay profile, and defines the path as a valid path. If there is no path exceeding the threshold in the delay profile of the pilot signal, then the path of the highest power in the delay profile of the pilot signal is forcibly defined as a valid path, and the information is notified to the forcible valid path notification management unit 17. The forcible valid path notification management unit 17 is notified of the "detection of a path" when there is a path exceeding the threshold. If there is no path exceeding the threshold, and a valid path is forcibly defined, the forcible valid path notification management unit 17 is notified of the "no path detection".

The path timing detected from the delay profile of the pilot signal is notified to the data demodulation unit 14. The data demodulation unit 14 performs a despread, a channel estimation, a RAKE combining and a data demodulation using the valid path timing detected from the delay profile of the pilot signal.

On the other hand, the path information detected from the delay profile of the transmission timing measuring control signal is notified to the transmission timing offset value calculation unit 18. If there is no path exceeding the threshold in the delay profile of the transmission timing measuring control signal, the valid path detection unit 16 defines no valid path in the delay profile of the transmission timing measuring control signal and notifies the forcible valid path notification management unit 17 of the "no path detection".

The transmission timing offset value calculation unit 18 calculates a relative transmission timing offset value P to be added during the next transmission to the wireless device 3a such that the path of the highest power in the valid paths is located at the target path reception position Tmax. If the path detection information notified from the forcible valid path notification management unit 17 is "no path detection", the transmission timing offset value calculation unit 18 is not operated.

When the status in which the calculation of the transmission timing offset value is performed or not is notified (step S31 shown in FIG. 8), the transmission timing measuring signal control information generation unit 23 generates the control information Qn (Qn=0 indicating no transmission, and Qn=1 indicating transmission) (n=1, 2) as to whether or not the wireless device 3a transmits a transmission timing measuring signal next time, and the control information R (R=0 indicating no initialization, and R=1 indicating initialization) as to whether or not the transmission timing offset value is initialized (step S32 in FIG. 8).

The signal combination unit 20 combines the transmission data signal and the control information, and transmits the result to the wireless device 3a through the transmission unit 21, the duplexer 12 and the antenna 11 (step S33 shown in FIG. 8). The SIR measurement unit 19 calculates the SIR after calculating the S and I based on the path timing detected from the delay profile of the pilot signal. For the SIR and I, a time average value is taken using an oblivion average (step S34 shown in FIG. 8). When the path detection information notified from the valid path detection unit 17 indicates "no path detection" (step S35 shown in FIG. 8), the SIR measurement unit 19 does not update the time average value in the current process. That is, the previous time average value is used (step S36 in FIG. 8). If the path detection information notified from the valid path detection unit 17 does not indicate "no path detection" (step S35 shown in FIG. 8), the time average value is updated (step S37 shown in FIG. 8).

In FIG. 7, the wireless device 3a includes the antenna 31, the duplexer 32, the reception unit 33, the signal separation unit 34, the control signal demodulation unit 35, the signal combination unit 36, the transmission timing control unit 37, the transmission unit 38, and the transmission timing measuring signal control unit 39.

The reception unit 33 transmits to the signal separation unit 34 the signal received from the wireless device 1a through the antenna 31 and the duplexer 32 (step S41 shown in FIG. 9). The signal separation unit 34 separates the received signal into the data signal and the control signal (step S42 shown in FIG. 9), and transmits the control signal to the control signal demodulation unit 35. The control signal demodulation unit 35 demodulates the control signal, and transmits to the transmission timing control unit 37 the relative transmission timing offset value P in the demodulated control information, and the control information R as to whether or not the transmission timing offset value is to be initialized (step S43 shown in FIG. 9).

The transmission timing measuring signal control unit 39 transmits the transmission timing measuring signal to the signal combination unit 36 (step S45 shown in FIG. 9) when Q=1 (step S44 shown in FIG. 9), and does not transmit the transmission timing measuring signal to the signal combination unit 36 (step S46 shown in FIG. 9) when Q=0 (step S44 shown in FIG. 9). The signal combination unit 36 combines the transmission data signal and the pilot signal (step S47 shown in FIG. 9), and transmits the combined signal to the transmission timing control unit 37.

The transmission timing control unit 37 adds the relative transmission timing offset value P to the cumulated transmission timing offset value, and delays the transmission timing of a signal by the cumulated transmission timing offset value (step S48 shown in FIG. 9). If the control information R is 1 (step S49 shown in FIG. 9), the cumulated transmission timing offset value of the wireless device 3a is returned to the initial value (step S50 shown in FIG. 9). After delaying the signal by the cumulated transmission timing offset value, the signal is transmitted to the wireless device 1a through the transmission unit 38, the duplexer 32 and the antenna 31 (step S51 shown in FIG. 9).

Next, the operation of the transmission timing measuring signal control information generation unit 23 is described below. The transmission timing measuring signal control information generation unit 23 has the following three functions.

As the first function, the transmission timing measuring signal control information generation unit 23 instructs the wireless device 3a not to transmit a transmission timing measuring signal for 100 msec (the control information Q1 is set to "0" for 100 msec) (step S64 shown in FIG. 10) when there is no path exceeding the threshold in the delay profile of the transmission timing measuring control signal, and when the status in which the calculation of the transmission timing offset value is not performed occurs twice consecutively (steps S61, S62, and S63 shown in FIG. 10).

The wireless device 3a cannot transmit the transmission timing measuring signal for 100 msec when the control information Q1=0 indicating the transmission stop of the transmission timing measuring signal is received.

As the second function, the transmission timing measuring signal control information generation unit 23 instructs the wireless device 3a not to transmit a transmission timing measuring signal for 50 msec (the control information Q2 is set to "0" for 50 msec) (step S66 shown in FIG. 10) when the transmission timing offset value calculated by the transmission timing offset value calculation unit 18 is lower than a threshold (step S65 shown in FIG. 10).

The wireless device 3a cannot transmit the transmission timing measuring signal for 50 msec when the control information Q2=0 indicating the transmission stop of the transmission timing measuring signal is received. In the multiple access with the CP inserted, the path timing difference among users may be within the CP length. Therefore, the above threshold is set as the CP length.

If it is anticipated that the wireless device 1a does not utilize the transmission timing measuring signal although the wireless device 3a transmits it owing to the two functions of the transmission timing measuring signal control information generation unit 23 described above, the wireless device 3a does not transmit the transmission timing measuring signal to the wireless device 1a. Thus, if the wireless device 3a might have interference to the radio resources (frequency, time slot, etc.) of another wireless device (not shown in the attached drawings), an advantage that the amount of interference can be reduced is obtained.

There can be a method of assigning radio resources used by the transmission timing measuring signal of the wireless device 3a to another wireless device. In this case, an efficient use of the radio resources can be achieved.

As the third function, the transmission timing measuring signal control information generation unit 23 considers that the path timing of the wireless device 3a is shifted outside the search range of the wireless device 1a when there is no path exceeding the threshold in the delay profile of the transmission timing measuring control signal, and when the status in which the calculation of the transmission timing offset value is not performed occurs 20 times consecutively, and sets the control information R, which indicates whether or not the cumulated transmission timing offset value is to be initialized, to 1. That is, the transmission timing measuring signal control information generation unit 23 transmits an instruction to the wireless device 3a to return the cumulated transmission timing offset value of the wireless device 3a to the initial value.

The wireless device 3a returns the cumulated transmission timing offset value to the initial value when the control information R=1 is received. Thus, although the reception path from the wireless device 3a is moved outside the search range of the wireless device 1a by a wrong instruction of the wireless device 1a, the reception path from the wireless device 3a can be returned to the search range because the initial value is predetermined such that the path falls in the search range of the wireless device 1a when the transmission timing offset value is the initial value.

Simultaneously, the wireless device 1a releases the wireless device 3a from the scheduling, and the wireless device 3a returns to the mode in which a reservation can be made for the scheduling using a reservation channel (refer to "Physical Channels and Multiplexing in Evolved UTRA Uplink" (3GPP TSG RAN WG1 #42 on LTE R1-050850)).

Thus, according to the second exemplary embodiment, when a searcher cannot detect any sample exceeding the path level threshold, in the delay profile, the demodulation performance of a receiver can be improved by forcibly setting one valid path.

On the other hand, when a valid path is forcibly set, the adaptive transmission timing controlling operation is not collapsed by stopping the calculation of the transmission timing offset value. In addition, according to the second exemplary embodiment, the radio resources can be efficiently used by allowing the transmission timing measuring signal to utilize the radio resources only when a path exceeds the threshold, or only when there is a large shift from the target reception timing.

Furthermore, according to the second exemplary embodiment, when a valid path is forcibly set, the results of the estimation of chip noise power and signal to noise+interference power ratio are not updated, thereby improving the estimation accuracy.

In a wireless communication system according to a third exemplary embodiment of the present invention, a path of the highest power is forcibly detected as a valid path when no path exceeds a predetermined threshold, and a received signal is despread and demodulated using the valid path. A path of the highest power in the paths detected previously may be forcibly detected as the valid path.

In the despread and demodulating process, although the power of the path is as low as the level not exceeding the threshold, it is better to use the path as a component of time diversity by the HARQ (hybrid automatic repeat request) and reception antenna diversity so far as the path timing is correct, thereby improving the S/N (signal/noise) by the MRC (maximal ratio combining) and RAKE combining, and improving the characteristic. Furthermore, although wrong path timing is used, no critical result occurs in operations.

However, since there is a high possibility that the reception path timing largely changes in a short time during high-speed travel, the demodulating operation is stopped during high-speed travel. That is, the forcible detection of the valid path is not performed. To determine whether or not a mobile station is traveling at high-speed, a Doppler frequency is estimated, and it is determined whether or not the estimated Doppler frequency exceeds a predetermined threshold.

In the adaptive transmission timing control, when there is no path exceeding the threshold, a base station does not issue to the mobile station a request to change the transmission timing. If the path timing is correct, the convergence time to the target position is shortened in the adaptive transmission timing control. However, if wrong path timing is attempted to be moved to a correct position, then the true path timing position is largely deviated from a range where a search can be performed (search range), and user path timing is completely lost.

The above-mentioned state will be explained using FIGS. 16 and 17. The transmission timing is delayed such that the path of the highest power is to be located at the position of the maximum propagation delay time Tmax of an incoming path shown in FIG. 16. Since the maximum propagation delay time Tmax of an incoming path is the maximum propagation delay time in the possible signal delay time, it is considered that a further delayed position is designed as a range not to be searched.

In FIG. 16, a true path timing position is depressed, and a wrong path is selected as a path of the highest power. As shown in FIG. 17, if this path is traveled to the position of the maximum propagation delay time Tmax of an incoming path, the true path timing is deviated from the search range, and the path is lost. When a request to change the transmission timing is issued, it is necessary to select a high reliability path as a path of the highest power. It is also considered that the transmission timing is to be changed only when a more reliable path is detected by providing a path power threshold indicating a higher power level other than for the despread and the demodulating process.

When high accuracy is required as estimation accuracy of chip noise power for use in a CDMA (code division multiple access) frequency domain equalizer, or as the estimation accuracy of the signal-to-noise+interference power ratio, it is considered that the estimation accuracy is degraded if the chip noise power and the signal-to-noise+interference power ratio are obtained by performing a channel estimation based on a low reliable path. Therefore, when a valid path is forcibly defined, a time-averaged estimated value is not updated.

Figure 15:
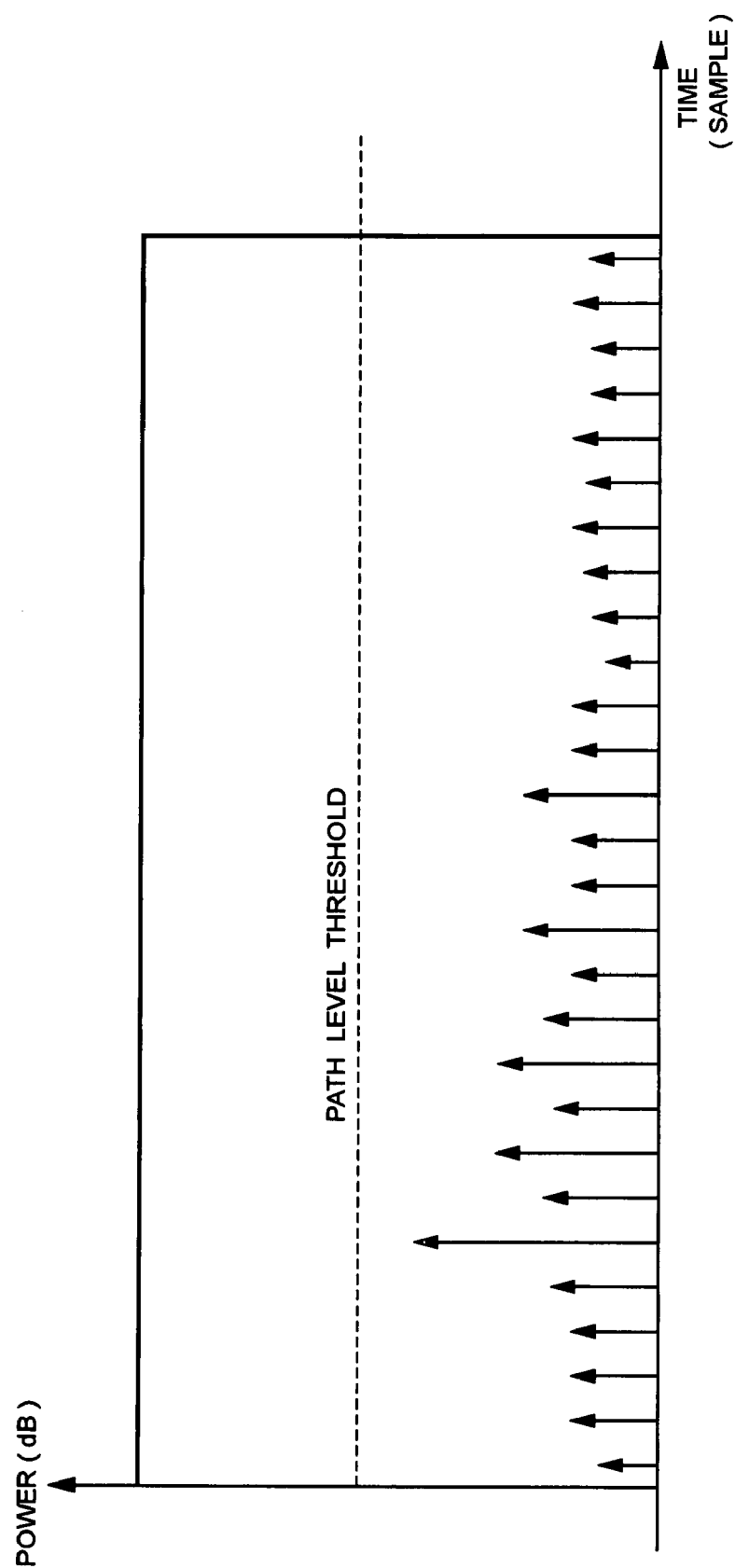
FIG. 15 is an explanatory view of the status in which there is no path exceeding a power threshold.

In the wireless communication system according to the third exemplary embodiment of the present invention, a case where a searcher can detect no sample exceeding the path level threshold in the delay profile is considered as shown in FIG. 15, and the situation can be used to improve the demodulation performance of a receiver. In this case, it is possible not to collapse the adaptive transmission timing controlling operation. Also in the wireless communication system according to the third exemplary embodiment of the present invention, it is possible to improve the estimation accuracy of the chip noise power used in the CDMA frequency domain equalizer, or the estimation accuracy of the signal-to-noise+ interference power ratio by considering the time when a path has not been detected.

In a wireless communication system according to a fourth exemplary embodiment of the present invention, when a path has not been detected in a base station, the transmission timing control is not performed. Therefore, radio resources are wasted although a signal for measuring a transmission timing is transmitted when it is expected that there is no pass exceeding a threshold in the base station. Therefore, when a no path detection status occurs a predetermined number of times A (A is an integer of 1 or more) continuously, the base station instructs the mobile station not to transmit the transmission timing measuring signal. Thus, the amount of interference to the signals of the other terminals can be reduced, thereby increasing the radio resources.

In the FDMA (frequency division multiple access) in which a CP (cyclic prefix) is inserted into a transmission signal, the orthogonalization among users can be secured without the transmission timing control so far as user reception timing is present in the range of the CP. Therefore, when the transmission timing offset value calculated by the transmission timing offset value calculation unit is smaller than the CP length, the base station instructs the mobile station not to transmit the transmission timing measuring signal for a predetermined time.

The case where the path level threshold cannot be correctly set, true path timing is deviated from a search range, and a path is lost is also considered. If the state in which no path exceeds the path level threshold occurs a predetermined number of times B (B is an integer of 1 or more) continuously in the base station, an instruction to return the transmission timing offset value on the mobile station to the initial value is transmitted. Then, although a path is once moved outside the search range, it can be returned to the search range again because, when the transmission timing offset value is the initial value, the initial value is predetermined such that the path falls in the search range of the base station. Furthermore, when the base station is performing the packet scheduling for the mobile station, the mobile station is regarded as a user in an undesired status, and can be released from the object of the packet scheduling.

Furthermore, when high accuracy is required as estimation accuracy of chip noise power for use in a frequency domain equalizer, or as the estimation accuracy of the signal-to-noise+interference power ratio, it is considered that the estimation accuracy is degraded if the chip noise power and the signal-to-noise+interference power ratio are obtained by performing the channel estimation based on a low reliable path. Therefore, when a valid path is forcibly defined, a time-averaged estimated value is not updated.

In the wireless communication system according to the fourth exemplary embodiment of the present invention, when a searcher can detect no sample exceeding the path level threshold in the delay profile, a one valid path is forcibly defined, thereby improving the demodulation performance of a receiver. On the other hand, when a valid path is forcibly defined, the calculation of the transmission timing offset value is stopped, thereby preventing the collapse of the adaptive transmission timing controlling operation.

In the wireless communication system according to the fourth exemplary embodiment of the present invention, the radio resources can be efficiently utilized by allowing the transmission timing measuring signal to use the radio resources only when a path exceeds the threshold or when there is a large shift from target reception timing. Furthermore, when a valid path is forcibly defined, the estimation results of a chip noise power estimation unit and a signal to noise and interference power ratio estimation unit are not updated, thereby improving the estimation accuracy.

An exemplary advantage according to the invention is that the demodulation performance of a receiver and the estimation accuracy of chip noise power and the signal-to-noise+ interference power ratio are improved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system which performs wireless communications between a first wireless communication device and a second wireless communication device,
   wherein the first wireless communication device comprises:
   a delay profile calculation unit for calculating a delay profile, by calculating a correlation value for a received signal;
   a valid path detection unit for detecting a valid path using the delay profile and forcibly detecting a valid path when there is no path satisfying a condition of the valid path; and
   a forcible valid path notification unit for notifying that the valid path is forcibly detected.

2. The wireless communication system according to claim 1, wherein the valid path detection unit forcibly detects a path of highest power in the delay profile as the valid path when there is no path satisfying the condition of the valid path.

3. The wireless communication system according to claim 1, wherein the valid path detection unit forcibly detects a path of highest power in previously detected paths as the valid path when there is no path satisfying the condition of the valid path.

4. The wireless communication system according to claim 1, wherein:
  the first wireless communication device further comprises a transmission timing offset value calculation unit for calculating a transmission timing offset value such that a path of highest power in previously detected paths is located at a predetermined target path reception position;
  the transmission timing offset value calculation unit sets the transmission timing offset value to zero when the forcible valid path notification unit notifies the transmission timing offset value calculation unit that the valid path is forcibly detected; and
  the second wireless communication device offsets transmission timing based on the transmission timing offset value.

5. The wireless communication system according to claim 1, wherein:
  the first wireless communication device further comprises a chip noise power calculation unit for calculating a chip noise power value; and
  the chip noise power calculation unit uses a value calculated previously as the chip noise power value when the forcible valid path notification unit notifies the chip noise power calculation unit that the valid path is forcibly detected.

6. The wireless communication system according to claim 1, wherein:
  the first wireless communication device further comprises a signal power to interference and noise power ratio calculation unit for calculating an interference and noise power estimation value; and
  the signal power to interference and noise power ratio calculation unit uses a value calculated previously as the interference and noise power estimation value when the forcible valid path notification unit notifies the signal power to interference and noise power ratio calculation unit that the valid path is forcibly detected.

7. A wireless communication system, comprising:
  a first wireless communication device comprising:
  a delay profile calculation unit for calculating a delay profile, by calculating a correlation value for a received signal;
  a valid path detection unit for detecting a valid path using the delay profile;
  a transmission timing offset value calculation unit for calculating a transmission timing offset value from the valid path information; and
  a transmission timing measuring signal control information generation unit for generating information for control of transmission of a transmission timing measuring signal; and
  a second wireless communication device comprising:
    a transmission timing control unit for controlling the transmission timing offset value; and
    a transmission timing measuring signal control unit for controlling transmission of the transmission timing measuring signal, wherein
    the control of the transmission timing offset value performed by the transmission timing control unit and the control of the transmission timing measuring signal performed by the transmission timing measuring signal control unit are performed based on the transmission timing offset value and the control information generated by the transmission timing measuring signal control information generation unit.

8. The wireless communication system according to claim 7, wherein:
  when a state in which the valid path detection unit detects no path exceeding a predetermined threshold and the transmission timing offset value calculation unit stops the calculation of the transmission timing offset value continuously occurs A times, A is an integer of 1 or higher, the transmission timing measuring signal control information generation unit generates and transmits the control information to instruct the second wireless communication device to stop the transmission of the transmission timing measuring signal for a predetermined time; and
  the transmission timing measuring signal control unit stops the transmission of the transmission timing measuring signal when the control information is received.

9. The wireless communication system according to claim 7, wherein:
  when a time difference between a propagation delay time of a reference path of the second wireless communication device detected by the valid path detection unit and a maximum propagation delay time of an incoming path is equal to or less than a predetermined threshold in the first wireless communication device, the transmission timing measuring signal control information generation unit generates and transmits the control information to instruct the second wireless communication device to stop the transmission of the transmission timing measuring signal for a predetermined time; and
  the transmission timing measuring signal control unit stops the transmission of the transmission timing measuring signal when the control information is received.

10. The wireless communication system according to claim 7, wherein:
  the transmission timing offset value calculated by the transmission timing offset value calculation unit is a relative offset value;
  the transmission timing control unit controls transmission timing based on a cumulated transmission timing offset value obtained by adding the relative offset value to an initial value of the transmission timing offset value;
  when a state in which the valid path detection unit detects no path exceeding a predetermined threshold and the transmission timing offset value calculation unit stops the calculation of the transmission timing offset value continuously occurs B times, B is an integer of 1 or higher, the transmission timing measuring signal control information generation unit generates and transmits the control information to instruct the second wireless communication device to return the cumulated transmission timing offset value to the initial value; and
  when the control information is received, the transmission timing control unit returns the cumulated transmission timing offset value to the initial value.

11. The wireless communication system according to claim 7, wherein:
  the transmission timing offset value calculated by the transmission timing offset value calculation unit is an absolute offset value;
  the transmission timing control unit controls transmission timing based on a cumulated transmission timing offset value obtained by adding the absolute offset value to an initial value of the transmission timing offset value;

when a state in which the valid path detection unit detects no path exceeding a predetermined threshold and the transmission timing offset value calculation unit stops the calculation of the transmission timing offset value continuously occurs B times, B is an integer of 1 or higher, the transmission timing measuring signal control information generation unit generates and transmits the control information to instruct the second wireless communication device to return the cumulated transmission timing offset value to the initial value; and when the control information is received, the transmission timing control unit returns the cumulated transmission timing offset value to the initial value.

12. A wireless communication device which performs wireless communications with another wireless communication device, comprising:

a delay profile calculation unit for calculating a delay profile, by calculating a correlation value for a received signal;

a valid path detection unit for detecting a valid path using the delay profile and forcibly detecting a valid path when there is no path satisfying a condition of the valid path; and a forcible valid path notification unit for notifying that the valid path is forcibly detected.

13. The wireless communication device according to claim 12, wherein the valid path detection unit forcibly detects a path of highest power in the delay profile as the valid path when there is no path satisfying the condition of the valid path.

14. The wireless communication device according to claim 12, wherein the valid path detection unit forcibly detects a path of highest power in previously detected paths as the valid path when there is no path satisfying the condition of the valid path.

15. The wireless communication device according to claim 12, further comprising a transmission timing offset value calculation unit for calculating a transmission timing offset value such that a path of highest power in previously detected paths is located at a predetermined target path reception position, wherein:

the transmission timing offset value calculation unit sets the transmission timing offset value to zero when the forcible valid path notification unit notifies the transmission timing offset value calculation unit that the valid path is forcibly detected; and the other wireless communication device offsets transmission timing based on the transmission timing offset value.

16. The wireless communication device according to claim 12, further comprising a chip noise power calculation unit for calculating a chip noise power value, wherein:

the chip noise power calculation unit uses a value calculated previously as the chip noise power value when the forcible valid path notification unit notifies the chip noise power calculation unit that the valid path is forcibly detected.

17. The wireless communication device according to claim 12, further comprising a signal power to interference and noise power ratio calculation unit for calculating an interference and noise power estimation value, wherein:

the signal power to interference and noise power ratio calculation unit uses a value calculated previously as the interference and noise power estimation value when the forcible valid path notification unit notifies the signal power to interference and noise power ratio calculation unit that the valid path is forcibly detected.

18. A wireless communication device which performs wireless communications with another wireless communication device, comprising:

a delay profile calculation unit for calculating a delay profile, by calculating a correlation value for a received signal;

a valid path detection unit for detecting a valid path using the delay profile;

a transmission timing offset value calculation unit for calculating a transmission timing offset value from the valid path information; and a transmission timing measuring signal control information generation unit for generating information for control of transmission of a transmission timing measuring signal, wherein the another wireless communication device performs transmission timing offset control and transmission timing measuring signal transmission control based on the transmission timing offset value and the control information generated by the transmission timing measuring signal control information generation unit.

19. The wireless communication device according to claim 18, further comprising a chip noise power calculation unit for calculating a chip noise power average value among frames, wherein:

the chip noise power calculation unit uses a value calculated previously as the chip noise power average value among frames when there is no path exceeding a predetermined threshold in the delay profile calculated by the delay profile calculation unit.

20. The wireless communication device according to claim 18, further comprising a signal power to interference and noise power ratio calculation unit for calculating an interference and noise power average value among frames, wherein:

the signal power to interference and noise power ratio calculation unit uses a value calculated previously as the interference and noise power average value among frames when there is no path exceeding a predetermined threshold in the delay profile calculated by the delay profile calculation unit.

21. The wireless communication device according to claim 18, wherein:

the device is used in code division multiple access (CDMA) wireless communications;

the valid path detection unit forcibly detects the valid path when there is no path exceeding a predetermined threshold in the delay profile calculated by the delay profile calculation unit; and the received signal is despread using the valid path.

22. The wireless communication device according to claim 18, wherein:

the device is used in code division multiple access (CDMA) wireless communications; and the valid path detection unit forcibly detects a path of highest power in the delay profile as the valid path when there is no path satisfying the condition of the valid path.

23. The wireless communication device according to claim 18, wherein:

the device is used in code division multiple access (CDMA) wireless communications; and the valid path detection unit forcibly detects a path of highest power in previously detected paths as the valid path when there is no path satisfying the condition of the valid path.

24. The wireless communication device according to claim 18, wherein:
the device is used in code division multiple access (CDMA) wireless communications; and
the valid path detection unit detects no valid path when there is no path satisfying the condition of the valid path and when an estimated Doppler frequency is greater than a predetermined threshold.

25. A valid path detection method for use with a wireless communication system which performs wireless communications between a first wireless communication device and a second wireless communication device, said method comprising:
calculating, at the first wireless communication device, a delay profile by calculating a correlation value for a received signal;
detecting, at the first wireless communication device, a valid path using the delay profile, wherein the valid path is forcibly detected when there is no path satisfying a condition of the valid path; and
notifying that the valid path is forcibly detected.

* * * * *